(12) United States Patent
Weber

(10) Patent No.: US 6,198,812 B1
(45) Date of Patent: Mar. 6, 2001

(54) INCOMING TELEPHONE CALL FILTER UTILIZING A DUPLICITOUS CALLER-ID RECOGNITION METHOD AND APPARATUS

(75) Inventor: Harold J. Weber, West Hyannisport, MA (US)

(73) Assignee: Effectrol Patent Trust, Centerville, MA (US)

( * ) Notice: Subject to any disclaimer, the term of this patent is extended or adjusted under 35 U.S.C. 154(b) by 0 days.

(21) Appl. No.: 09/159,490

(22) Filed: Sep. 23, 1998

(51) Int. Cl.[7] ....................................................... H04M 1/56
(52) U.S. Cl. ...................... 379/142; 379/67.1; 379/93.03
(58) Field of Search .................................. 379/142, 127, 379/179, 183, 184, 189, 171, 164, 161, 178, 252, 197, 199, 67.1, 88.21, 93.03, 93.04, 381; 455/415

(56) References Cited

U.S. PATENT DOCUMENTS

| | | | |
|---|---|---|---|
| 5,473,671 | * 12/1995 | Partridge, III | 379/142 |
| 5,644,629 | * 7/1997 | Chow | 379/142 |
| 5,852,653 | * 12/1998 | Reel et al. | 379/142 |
| 6,016,341 | * 1/2000 | Lim | 379/142 |
| 6,026,152 | * 2/2000 | Cannon et al. | 379/142 |
| 6,044,148 | * 3/2000 | Bleile | 379/142 |

* cited by examiner

Primary Examiner—Duc Nguyen
Assistant Examiner—Rexford N Barnie

(57) ABSTRACT

A telephone line incoming call filtering device. A ring-through of an incoming call to a subscriber's controlled telephone is reserved to a second call attempt quickly following a succession of a first call and a hang-up. As a result, nuisance calls such as trash calls from telemarketeers and other unwanted calls may be simply diverted to an answering machine. This nuisance call filtering is transparently obtained without even bothering the subscriber when the first call attempt rings more often than one or two times. On the other hand, repeating a rapid-fire succession of incoming calls where the first call attempt is allowed to ring only once or twice followed by a second call attempt are allowed to ring-through directly to the subscriber's telephone set. Filtering of unwanted calls is achieved by permitting the ring-through to occur only when the first call attempt is allowed to ring only a few times and distinctly a less number of times than ordinarily attempted by casual or nuisance callers. Then the second call attempt, when it follows the first call attempt in quick time succession is recognized as possibly valid and the ring-through occurs. Filtering may also be obtained by recognizing and storing the caller-ID of the first call attempt and then a second immediately occurring call attempt is intercepted and if the caller-ID of this second call matches the stored caller-ID of the second call, the ring-through to the subscriber's telephone set is permitted.

20 Claims, 11 Drawing Sheets

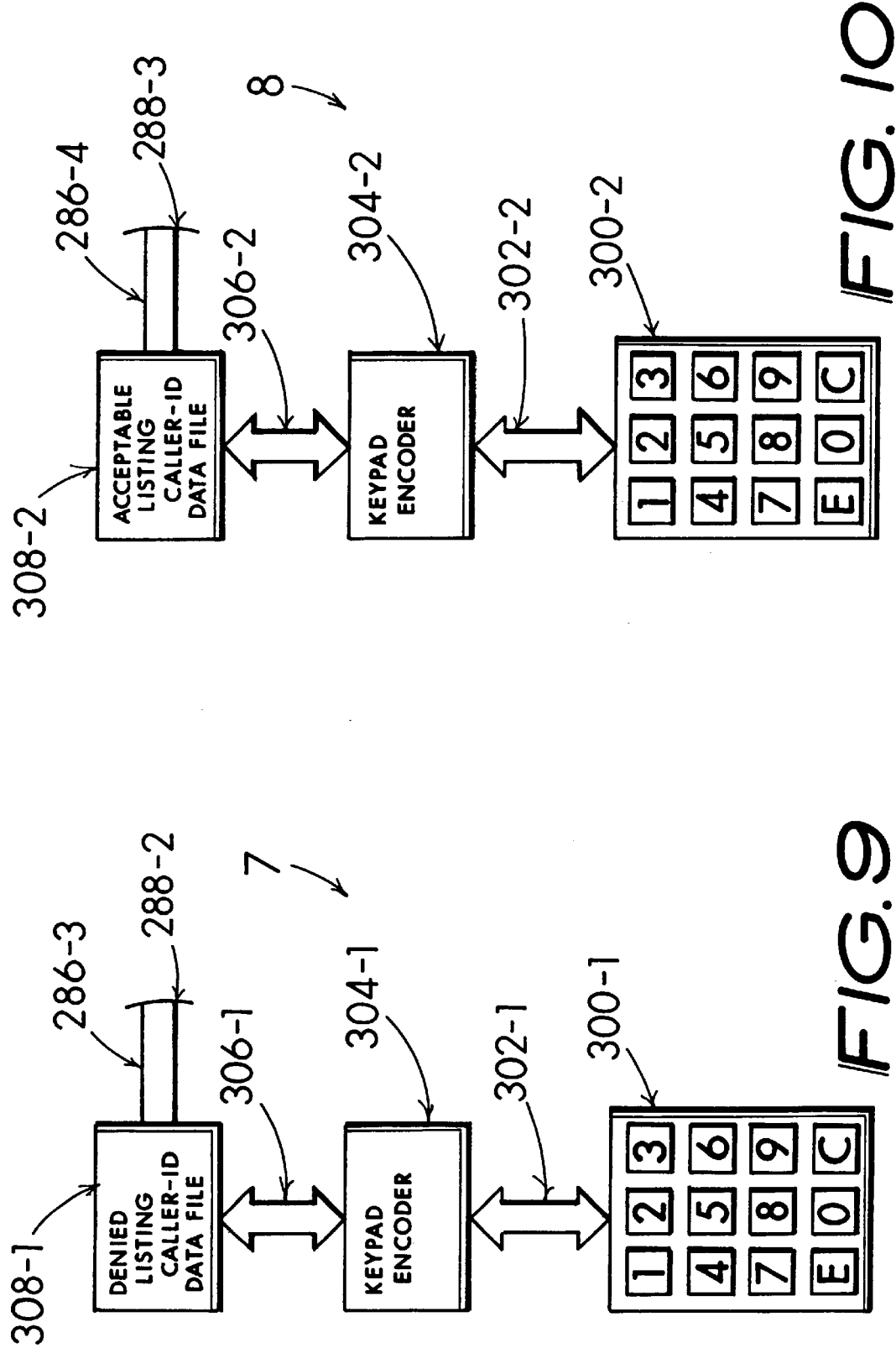

Figure 1:
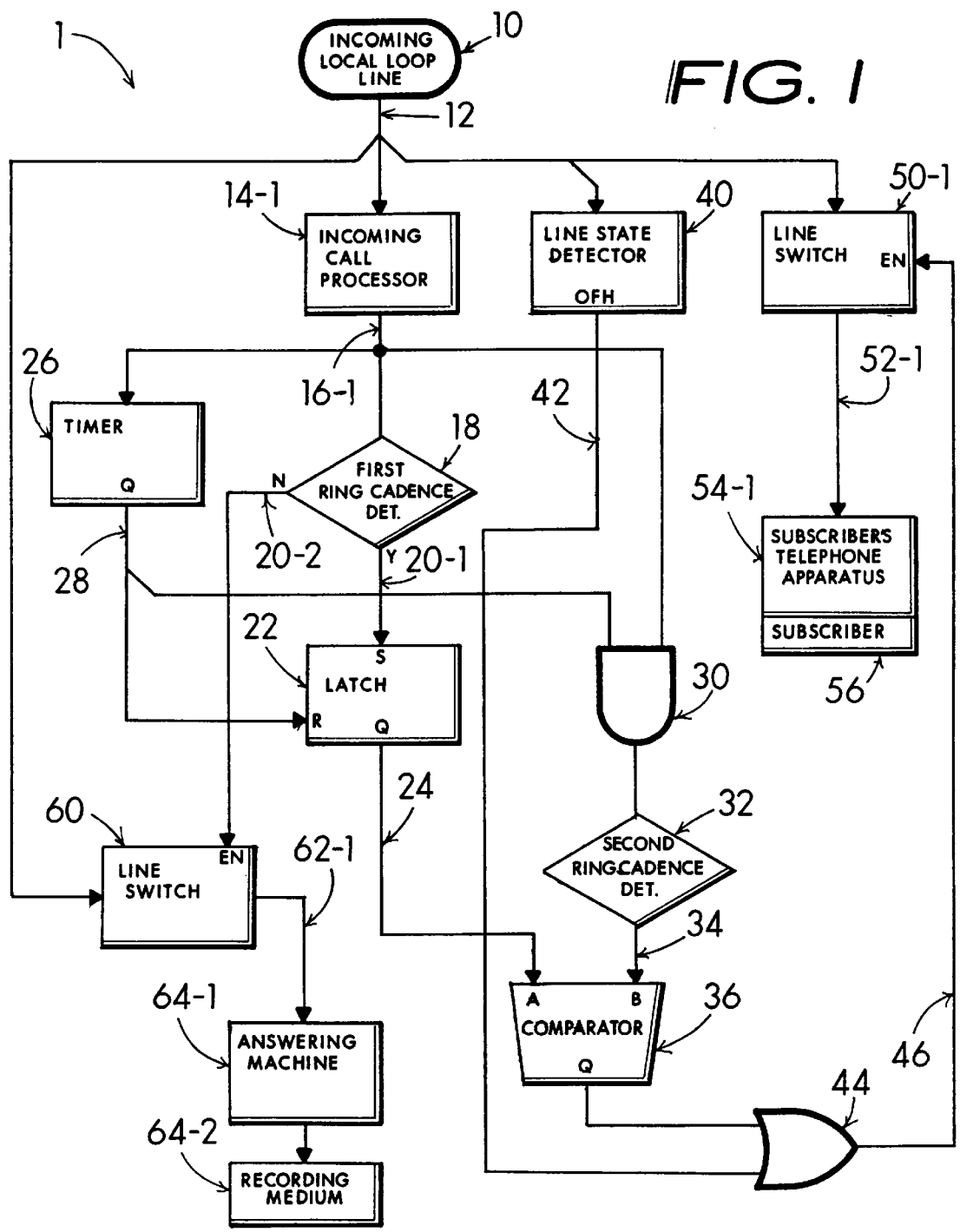

INCOMING TELEPHONE CALL FILTER UTILIZING A DUPLICITOUS CALLER-ID RECOGNITION METHOD AND APPARATUS

FIELD OF MY INVENTION

My invention pertains to the general field of telephony and especially to a residential telephone service and a small business telephone service. My invention relates to a utilization of a repeated call sequence wherein the first call is silent.

The first call's ring cadence is compared with a predetermined ring-count pattern. When an acceptable ring-count is obtained, the second call is routed to the subscriber's telephone set to telltale signal the called party. In other words, too many rings or too few rings during the first call attempt can be utilized to block the second call from feed through to the subscribers telephone set. My invention further pertains to a utilization of a caller identification (ordinarily known in the art field as "caller-ID") tag number as instrumental to filtering telemarketing and similar trash calls from calls which probably originate from known parties. Filtering is obtained by comparing a silent first call's caller-ID tag with an immediately subsequent second call's caller-ID tag. When a match is obtained the second call ordinarily rings through to the subscriber's telephone to hail the called party.

DEFINITION PROTOCOL

Throughout my teaching I utilize certain terms which may benefit from further definition:

TELEPHONE CALL FILTERING—A discrimination of wanted and unwanted telephone calls which may depend upon the caller's category, time of call or other factors.

CALLER—A party placing a call to a SUBSCRIBER or another party.

ORIGINATOR—A party placing a call to another party.

SUBSCRIBER—A party usually receiving a call from a CALLER or ORIGINATOR.

INTENDED PARTY—A telephone set to which a call is directed by a CALLER or ORIGINATOR.

INCOMING TELEPHONE CALL—A telephone call originated by a caller and arriving at a subscriber's telephone set.

TELEPHONE SET—A telephone apparatus including a conventional telephone, facsimile, answering machine, voice-mail machine and similar equipment.

LOCAL LOOP—Telephone line(s) between a telephone set and a central exchange.

RING CADENCE—A sequence of a plurality of about 17–25 Hz ringing signal pulses which usually turn-ON for 2 seconds and OFF for 4 seconds in continued alternation.

COMPONENT RING SIGNAL—A component portion of the RING CADENCE signal which is usually considered as the active-state portion, turned-ON portion, or HIGH-state portion having about 2 seconds duration and including 34–50 cycles of a.c. ring signal energy.

TELLTALE SIGNAL—Ringing or its equivalent audible or visual signal produced by the RING CADENCE signal; or an electrical enablement signal for a modem, an answering machine or the like.

TOLL CHARGE—A monetary cost in various form including coins dropped into a pay-station, billing against a charge card, or appearing on a monthly statement.

TRASH CALLS—Telemarketing calls and the like which have no intrinsic value or a negative value to the SUBSCRIBER.

NUISANCE CALLS—Unwanted calls usually from a known party, including estranged friends, but also including wrong numbers and the like.

ANNOYING CALLS—Telemarketing calls and other random and persistently recurrent calls from unwanted parties, including debt collectors, whether known or not.

CALLER-ID—Caller identification information provided as a secondary service by the telephone company in a signaling format ordinarily available as decodable and presentable data obtainable while the telephone set remains on-hook.

BACKGROUND OF MY INVENTION

A telephone may be beneficial or bothersome depending upon the timing, origin and purpose of an incoming telephone call. While many persons have recognized the advantage of being able to shut-out telemarketing and similar trash calls and to only receive calls from selected persons, every attempt to filter the incoming calls which may reach a subscriber's telephone set has met with some level of here-to-fore unresolved problem or user inconvenience as a side-effect. As a result, while telephone filtering systems have been known before, they have met with application resistance due to these and other shortcomings.

Unwanted and trash telephone calls extend a false sense of priority. Since their arrival expresses equal importance with any other call.

As a consequential result, they are ordinarily allowed to ring-through to the subscriber's telephone set.

The called party's privacy is obtrusively violated in a manner which is unacceptable in nearly any other form of communications. This violation occurs because an ordinary telephone set is virtually blind to the nature of incoming telephone calls. In current residential and small business settings, unwanted trash calls bear an equal priority with more important or urgent calls.

INCOMING CALL LEVELS

My invention addresses at least four distinct levels of incoming calls which require different filtering considerations.

URGENT CALLS are those calls from family members and business associates which may require immediate attention or have a quasi-emergency aspect associated with them and which you may ordinarily want to be able to immediately accept.

EXPECTED CALLS are those calls from family members and business associates which, while essentially routine in character, are of the sort which you will accept at nearly any time.

ROUTINE CALLS are those calls from various persons which may be handled at your convenience and therefore may preferably be diverted to an answering machine or voice mailbox, at least during designated times.

TRASH CALLS include a broad range of junk calls and in particular telemarketing calls which further include attempts by parties unknown to you to reach you, usually for reasons which serve their benefit more than yours. These calls are at best preferably diverted to an automated answering system.

USE OF A PIN NUMBER AS A FILTER

One well known device used for eliminating unwanted calls is a Tele-Screen™ Model TS300 phone protector which requires the caller to enter a previously agreed upon "personal code", i.e, a "PIN" (personal identification number) . This device actually answers the incoming call with a message (similar to) "Thank you for calling. Please enter the four-digit pass code". Four principal drawbacks for the use of this device are:

1) USE OF A PIN—The caller must recall and use the correct four-digit PIN identification code. This can be bothersome for potential callers from whom a subscriber wants to receive calls, since they may have simply forgotten or otherwise misplaced the subscriber-issued identification code numbers.

2) UNNECESSARY TOLL—The device answers the incoming call thereby breaking the circuit and causing the calling party to assume a toll-charge if from out-of-area even when the subscriber is not available to accept the call.

3) CALL IS LOST—No provision for diverting unanswered calls or calls originating from a person not having or recalling the identification code is provided, where such calls may be recorded on an answering machine or sent to a different telephone.

4) UNNECESSARY RINGS—One ring is delivered before the device activates and blocks subsequent rings.

ANSWERING MACHINE AS A CALL FILTER

Answering machines are also well known which respond to incoming calls with a subscriber's pre-recorded message. When the caller replies to leave a message, the subscriber can "decide" whether to pick-up the line or not, usually upon hearing the caller's voice. As with the Tele-Screen™ device, the use of an answering machine invariably results in a toll-charge for the calling party in event the subscriber is not available to answer.

COMPUTER VOICE-MAIL AS A FILTER

Computer voice-mail systems may also be utilized which answer and record incoming messages. Software for such a system is represented by SuperVoice 2.2™ Software (©Pacific Image Communications, Inc.) which affords the voice-mail response and records incoming calls in accord with one or more "mail-box" code selections.

CALLER CONVENIENCE

When a subscriber's telephone is locked-out by a call diverter, such as the prior art knows, important incoming calls from relatives and friends may be refused, hence lost. It is inconvenient and simply expecting too much to have all of a subscriber's friends always remember a unique access code number. It can also be confusing to technically-challenged persons as to how to use the access code number even if they have it before them. In particular, under the pressure of an emergency, a recalling of an access code number can escape even a person with a usually infallible memory.

Since the principal function for call filtering by most subscribers is to eliminate solicitous sales calls and the like, especially when they may arrive at inconvenient times.

FLAGGING A CALL

I have found that a far simpler yet highly effective call filtering method can be utilized.

A forthcoming call may be flagged by a predecessory call having a abreviated ring cadence. This flagging may occur with no toll charge against either party, if the called party is not home or does not choose to answer. No identification numbers are needed. All that is required is to merely remember to repeatedly call the same number twice while hanging up briefly between the two calls. By limiting the first call attempt to only one or two "rings" and hanging up, the first incoming call sets-up my filtering device to receive a second call which the knowing caller will immediately place. When the second immediately successive call is received, it is permitted to ring-through upon condition that the first call is of a proper format (of a few rings followed by a hang-up). If a first call occurs inadvertently (such as by someone having dialed a wrong number), my device times-out after a finite interval preset in the range of 30 to 180 seconds, more or less. If the first call's ring cadence persists for more than a few ring cycles the first call is furthermore recognized as an improbable caller (e.g., a trash call or an unwanted call) and simply diverted to an answering machine or left unanswered.

CALLER-ID FILTER APPROACH

Thanks to a caller identification (caller-ID) provision which is readily available to most telephone system customers at a nominal monthly charge, it is now possible to sort-out viable calls from nuisance calls with even better reliability. One way to accomplish caller-ID filtering is through calling an intended party twice in succession and presenting the same caller-ID number. My invention may process and prioritize the calls and make a decision to route the second call directly to the subscriber.

TOLL-CALL CONSERVATION

Toll calls cost the caller money when the subscriber's telephone is answered by an answering machine or by the mentioned Tele-Screen™ device. A non-local calling party must pay a toll. This can be costly to relatives and friends and with the advent of my invention, such tolls are unnecessary. The reason is that prior-art answering devices such as answering machines, voice-mail computers and so forth all implement an off-hook pickup by the by the subscriber. I now teach how this off-hook line interruption and toll charge may be overcome, wherein the incoming call may be filtered with no cost to the caller and without cheating the telephone service provider.

ELDERLY AND INFIRM USERS

Telephone calls made to elderly persons are often of a nuisance nature. It is difficult if not downright dangerous for an elderly person to have to locate and answer a ringing telephone, only to find out it is merely someone trying to sell him or her something which is unneeded.

Relatives such as children, friends and others may have reason to reach the elderly person but without sacrificing the telephone to all sorts of annoying trash calls originating from telemarketeers and the like. This selective filtering of desirable calls from undesirable calls is now practicable through use of my device.

Telemarketing calls are well known to frequently be intended to prey upon gullible elderly persons. While such practice is not universal, it is widespread enough that the typical elderly person needs some buffering from such compromising calls. As is also well known, many elderly persons are particularly vulnerable to these types of predatory telemarketing calls in that they harbor a desire to be more self-sufficient in spite of their age or physical condition. As a result predatorial telemarketing calls from confidence men which make dubious and false promises tend to defraud and victimize elderly persons out of huge sums of money every year.

For mere example, on page 16 of the AARP BULLETIN of October 1997 Malcolm Sparrow of Harvard University's Kennedy School of Government says: "Don't ever respond to telemarketers or people who call unannounced at your door offering some special deal from Medicare. Send them away and call the Police."

As a result of my invention's provision for trash call, crank call and nuisance call filtering, the elderly or infirm person using my invention is now better protected and far less likely to be hailed by a ringing telephone when the call is unrelated to his usual circle of friends and relatives. More pointedly, the trash telemarketing calls can be efficiently diverted to an answering machine or, better yet, simply left unanswered.

COMPARISON WITH RELATED ART

About the only "art" known to me at this time which vaguely related to my invention is providing a limited level of call screening through utilization of an answering machine or a selective response device such as the Tele-Screen™ device, or by viewing the incoming call number on a "caller identification" device prior to answering. While each of these earlier devices may provide some limited extent of call screening, they fail to enable the usual telephone set to merely ring when the ringing call is most likely someone to whom you do wish to speak.

SUMMARY OF MY INVENTION

My invention's essence is fundamentally a telephone line call filter or automatic call screening device. It enables a user of an ordinary telephone to be selective about answering incoming calls. Operation is obtained by recognizing the successive repetition of an incoming call originated by a caller. This means that the caller places a first call, lets it ring through one or more times and hangs up. The called party or local subscriber's telephone remains silent and does not ring under this first call instance. Then the caller immediately re-dials and places a second call to the same subscriber's number whereupon the called party's telephone commences ringing.

CALLER-ID

I utilize a commonly available "caller identification" (caller-ID) technique to further enhance my device's implementation and thereby activate the call-through to the subscriber's telephone on the immediately repeated second call, while rejecting ringing on the first call. An operational sequence begins when the first call arrives on the subscriber's telephone line and it passes through a caller-ID recognition circuit. The incoming call's identity is immediately decoded revealing the originating caller's telephone number. This first decoded incoming call number is temporarily stored in a local memory associated with the subscriber's telephone apparatus.

RE-DIAL ADDS EASY SECURITY

Upon an immediate re-dialing by the same caller, the same caller-ID number is again decoded. This second caller-ID number is compared with the temporarily stored first caller-ID number. When they match, the subscriber's telephone is coupled with the incoming line and ringing commences.

I show that a filtering of calls is achieved by rejecting calls which are only once presented. These once-called incoming calls are dead-ended and never reach the subscriber's telephone set. On the other hand, calls which occur twice in immediate succession are sent to the subscriber's telephone set for immediate ringing and likely answering by the subscriber.

A time-out and erasure of the stored first caller-ID number provides a still further safeguard against unwanted and trash calls, since incoming calls even if from the same originating number will not activate my device if the second caller-ID number is presented after erasure of the stored first caller-ID number. I typically establish about 1 minute as the time window, whereafter the stored first caller-ID number is erased.

CALL BLOCKING ACCESS

A caller may have implemented a CALL BLOCKING or LINE BLOCKING service provided by the telephone company. In other words, when the caller with CALL BLOCKING service calls you their call number will not be revealed on your caller-ID display.

If a calling party trying to reach you, has CALL BLOCKING installed on their telephone line, the effect of this provision may ordinarily be overcome on a call-by-call basis by the calling party merely by dialing a prefix of *82 on a TouchTone® telephone (or dialing 1182 on a rotary or dial pulse phone) before dialing the intended number. (In systems serviced by Bell Atlantic.)

In this event the caller's number is translated to your (the called-party's) station and my device can enable your telephone set to accept and filter the incoming call as though no CALL BLOCKING was implemented by the calling party. This filtering occurs in the same manner as previously described, where the first call's caller-ID number is stored and the second call's caller-ID number is compared with the stored number. A match enables ring-through to your telephone set. As a result, an informed person can reach you.

IF NO CALLER-ID NUMBER APPEARS

Sometimes a caller forgets to dial the necessary prefix (such as *82 ) to enable an otherwise blocked caller-ID service. When the caller-ID service is inadvertently left blocked by the calling party, a disclaimer comment is typically shown on your caller-ID display, such as "OUT OF AREA" or "ANONYMOUS". In this arrangement, the first call's OUT OF AREA message code is stored in memory as a data signal and then upon receiving the second call the second occurrence of the OUT OF AREA message code data signal will be compared with the just-stored OUT OF AREA code and the device may reasonably assume that the call is from an expected party.

Clearly some compromise in integrity of such a presumptive filtering technique may occur, but the likelihood for false call ring-through by two different and randomly occurring OUT OF AREA trash calls arriving in closely spaced time-sequence is minimal. To achieve this time sensitive recognition, I provide a time-out memory clearing step which erases the first arriving call's stored value (whatever it is) soon after it is entered into memory in absence of an immediate second follow-up call from the same party or an immediately recurring OUT OF AREA call. I have found about 1 minute of delay before automatically dumping the memory contents appears to be appropriate. I have further found that making the delay somewhat adjustable over a range between about 30 seconds and 5 minutes can enable the subscriber to "fine tune" the additional filtering effect afforded by this time-out to his personal preference. In a practical sense, I have found that for calls to residential numbers the delivered level of filtering is highly effective.

I anticipate a switch or the like which can be set by the subscriber wherein this presumptive filtering may be either TRUE wherein the call is directed to the subscriber's telephone set or that the assumption is FALSE whereby the incoming call is directed to an ancillary telephone device, such as an answering machine.

OUT OF AREA CALLS DIVERTED

When an incoming call arrives without a caller-ID signature and as a result, triggers an OUT-OF-AREA or ANONYMOUS telltale my invention may be alternatively implemented to merely divert such incoming calls to an answering machine. Therefore the caller is gently reminded (by having obtained connection to the answering machine upon the first call) that they left their CALL-BLOCKING activated and they can try to recall using the *82 prefix, if they feel the call is sufficiently urgent. Of course, this does cost an out-of-area caller a modest toll charge for interception of the first call by the subscriber's answering machine.

PRIORITY CALLS

Certain callers may be admitted immediate ring-through in priority to other callers. I accomplish this in my invention by providing a look-up file of "acceptable" incoming telephone numbers. When a caller-ID number matches one of these on-file numbers, ring-through to the subscriber's telephone set is allowed. To further control the freedom of access and hence the bother wrought upon the subscriber even by priority callers, I have found that assigning several tiers of priority is desirable. In a most basic sense, these priority tiers include:

BASIC RING-THROUGH—Where an incoming call's caller-ID telltale matches a number in a first look-up file the ring-through occurs at any time and in tantamount priority to other filtering limitations imposed by my device.

LIMITED RING-THROUGH—Where an incoming call's caller-ID telltale matches a number in a secondary look-up file and the ring-through is restricted to ring-through under certain time or other predetermined conditions while otherwise the call may be diverted to an answering system.

TRASH CALLS SCREENED

I find that the screening or filtering of calls is excellent particularly in regard to obscuring trash calls from telemarketeers as well as casual nuisance calls. Primarily I believe this occurs because nuisance calls and trash telemarketing calls are seldom repeated in quick succession. Typical telemarketing and solicitation calls are made from lists or by automatic dialers which sequentially step through every number in an exchange. Unanswered numbers may be set aside for later retry as part of a sub-list. In either case, the most likely approach is to try each number once for each call attempt. No return indication is reported by my filtering device to the unwanted caller that your line is filtered or selectively diverted. Instead, upon making the first call, the caller is essentially led to believe that you are merely unavailable and away from the telephone. This reasonable assumption by the caller is re-enforced since your telephone does not pick-up or answer the call, or conversely the first call is diverted to an answering system.

Through utilizing an intentional time-out function, my invention further filters a remaining chance for inadvertent reception of unwanted calls which might be repeated without an intervening "other number" call. I achieve this advance in filtering by only storing the initial incoming call for a short period of time, say 30 seconds to perhaps 5 minutes. If legitimate incoming calls are repeated immediately, the 30 second setting may act to filter virtually all residual chance for inadvertent ring-through of unwanted calls and especially trash telemarketing calls.

Realize that nuisance calls from a troublesome caller are minimized, because a harassing person is less likely to immediately re-dial the same number without a modest lapse of time which may exceed the narrow 30 second limit.

Extremely troublesome calls may also be intercepted by a CALL-TRACE provision (activated by dialing *57 or 1157 in the Bell Atlantic system) in the rare event where the nuisance call does persistently ring-through.

CALLS MAY BE DIVERTED

During the usual ringing sequence associated with the first call attempt, my device may "switch-over" to an answering machine or another telephone apparatus after having received several "rings". For example, after 2 rings the incoming call may be re-directed to an answering machine (or a voice-mail computer) for routine answering response. In this manner, no call is truly lost (e.g., left unanswered) but rather merely blocked from ringing directly through to you as the subscriber.

You must understand that in order to achieve the necessary storage of the incoming call's caller-ID number in memory in my invention, merely one ring is needed, whereafter the calling party may hang-up and re-dial your number again.

FORGETTING A PIN IS NO PROBLEM

In prior systems proposing attempts at filtering incoming calls, such as attempted with the known Tele-Screen™ call screening device, a personal identification number or "PIN" may be used as the basis for incoming call verification. For example, with the Tele-Screen™ device a number such as 4736 may be assigned as a PIN. This means that every person whom you want to be able to call you directly has to remember that the PIN number is 4736. While this is practicable under ideal conditions, it is not a dependable scheme for use by your authorized list of potential callers when they seldom use it and they may simply forget the PIN number.

Consider how much simpler life can be if no PIN number is needed. All your potential caller has to remember is to place two successive calls from any telephone. With most contemporary telephones having a REDIAL capability, this presents no particular problem since the second call can easily be placed by pressing the REDIAL button.

CALLER-ID BLOCKED SERVICE

In some cases caller-ID is optionally blocked by the caller. In other words, no calling-party number is available to the subscriber. Instead a disclaimer comment is displayed, such as OUT OF AREA. In this arrangement, the first call OUT OF AREA code is stored in memory and then upon receiving the second call the OUT OF AREA code will be comparable to the stored OUT OF AM& code and the device will reasonably assume that the call is from a knowing party.

Clearly some compromise in filtering integrity may occur, but the likelihood for false call ring-through by two different OUT OF AREA trash calls arriving in a properly timed sequence is minimal. I provide a time-out memory clearing step which erases the first arriving call's stored value soon after it is entered into memory in absence of an immediate second follow-up call from the same party. I have found about 1 minute of delay before automatically dumping the memory contents to be appropriate. I have further found that making the delay somewhat adjustable or presetable, for example between 30 seconds or less and 5 minutes or more can enable the subscriber to "fine tune" the additional filtering effect afforded by this time-out to his personal preference.

OBJECTIVES OF MY INVENTION

My invention's principal objectives provide many novel advantages over prior art which now serves to afford a user of telephone service a greater level of safety and convenience.

An overall objective of my invention is to strip trash calls and nuisance calls from reaching a subscriber's telephone set.

A further objective of my invention is to recognize a repeat of a identical caller-ID number which may occur when two incoming calls arrive in immediate succession within a brief time window wherein the first call is not answered and the second call may be directed to a subscriber's telephone set.

An intent of my invention is to enable an ordinary telephone to utilize caller-ID enabled filtering and thereby be made immune to most trash calls from telemarketeers and ridding a subscriber the inconvenience of unnecessarily answering such problematic calls A goal of my invention is to provide a subscriber with an isolation from receiving unwanted and unimportant calls while still enabling a receiving of calls which are more likely to be important.

Another objective of my invention is to automatically divert as nearly all incoming trash and unwanted calls to an answering machine for subsequent review at the subscriber's convenience.

Another aspect of my invention is to provide automatic filtering of incoming calls without an assigning of a PIN number for caller access.

A variant objective of my invention is to produce a filtering by recognizing a first incoming call to ring only once or twice, whereupon it hangs up and then immediately repeats itself within a limited period of time. I am basing the success of this variant objective on a propensity for incoming trash calls, unwanted calls and calls from unknown parties to ring more than a few times on their first attempt.

An optimally refined objective for this invention is to block a subscriber's telephone set from an unconditional receiving of unwanted incoming calls.

A further aspect of my invention is to prioritize into two broad categories, one being higher priority calls which a subscriber wants to ring through to his telephone set and the other being lower priority calls which the subscriber may prefer to have diverted to an answering system.

Still another aspect of my invention is to recognize a unique two-tier ringing sequence pattern as a flag to direct a call to a subscriber's telephone, whereas other incoming calls may be diverted to an answering system.

Yet a time-related aspect of this translation of an incoming call filter based upon a comparison of successive caller-ID data may serve to further differentiate different caller-ID data as being acceptable during different time windows.

It is these and other objects, intents and goals of my invention which I now describe in detail with drawings and descriptive text. Understand that my invention may be embodied as a free-standing telephone accessory device functional unto itself. It may also be incorporated into other hardware devices such as an answering machine, standard telephone set, cordless telephone set and of course included integral with an otherwise conventional caller identification device. In any elected implementation, it serves a distinct function of recognizing a likelihood that an incoming call is of sufficient importance to warrant ring-through to the subscriber. A practitioner must realize that my invention is unto itself meritorious as an telephone line incoming call filtering device as herewithin described. Its novelty and functional value for determining which incoming calls may be admitted ring-through while other unknown and nuisance calls may remain unanswered or diverted to a voice mail machine shall absolutely not be diluted in any way whatsoever by any apparatus into which it is included or by the idiomatic character of any line which I may expansively describe for illustrative purposes.

DESCRIPTION OF MY DRAWINGS

My invention is depicted on 11 sheets of drawings including 12 illustrative figures.

FIG. 1—Logic flow chart for an incoming call filter based upon ring cadence control.

Figure 2:
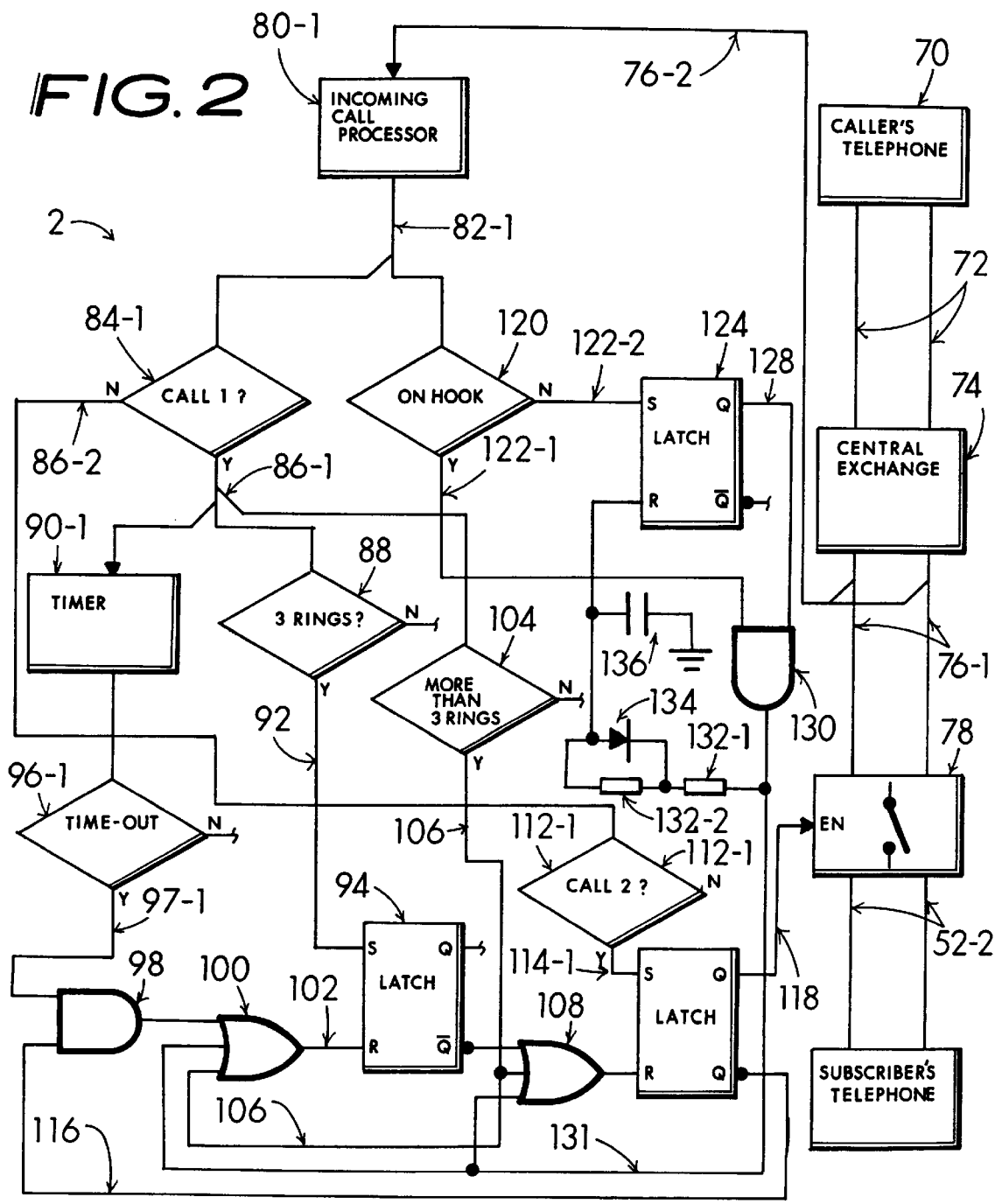

FIG. 2—Logic flow chart for an incoming call filter based upon ring count control.

Figure 3:
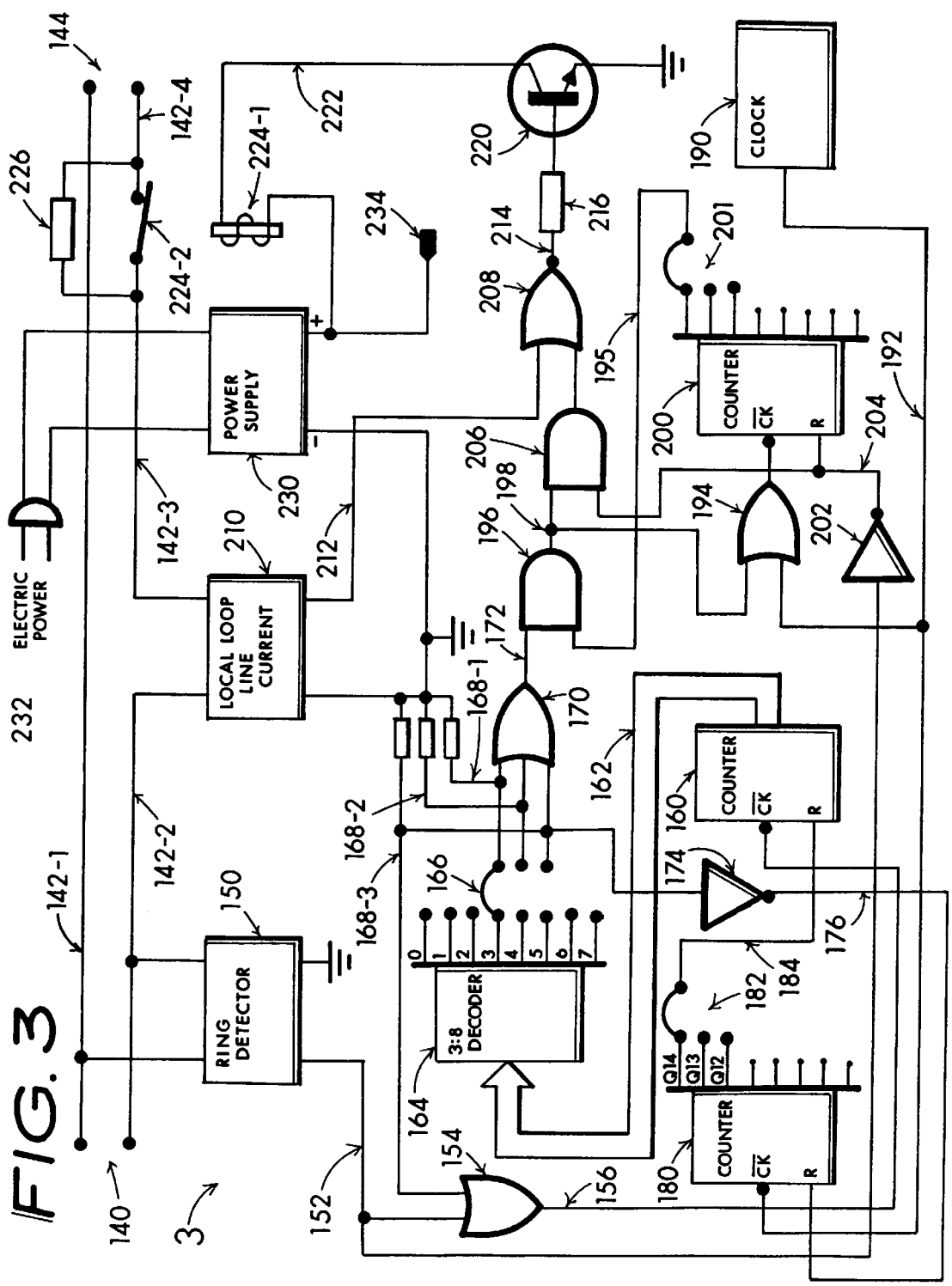

FIG. 3—Schematic diagram for ring-count based call filter device.

Figure 4:
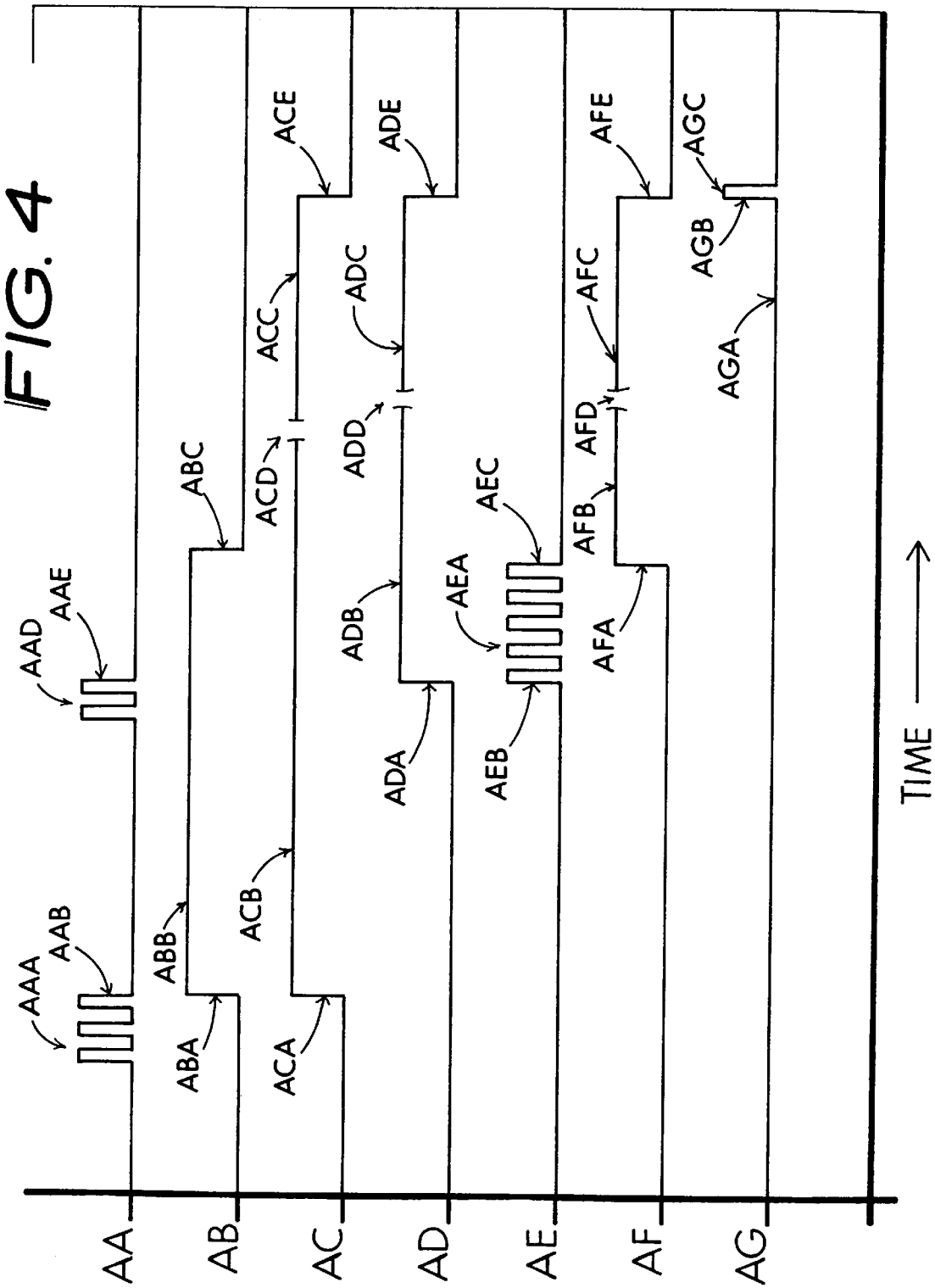

FIG. 4—Timing diagram for acceptance of an incoming call.

Figure 5:
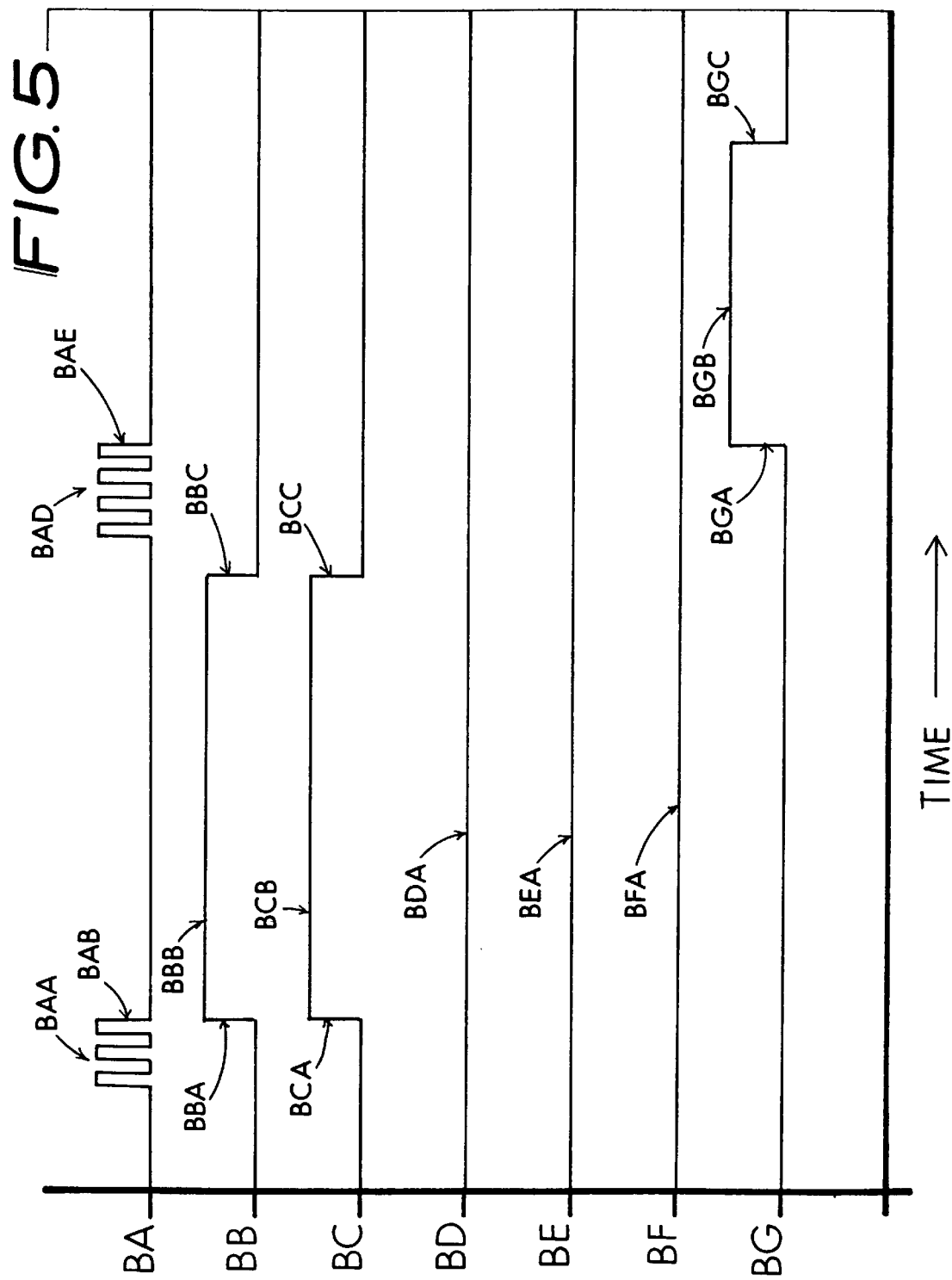

FIG. 5—Timing diagram for rejection of an incoming call.

Figure 6:
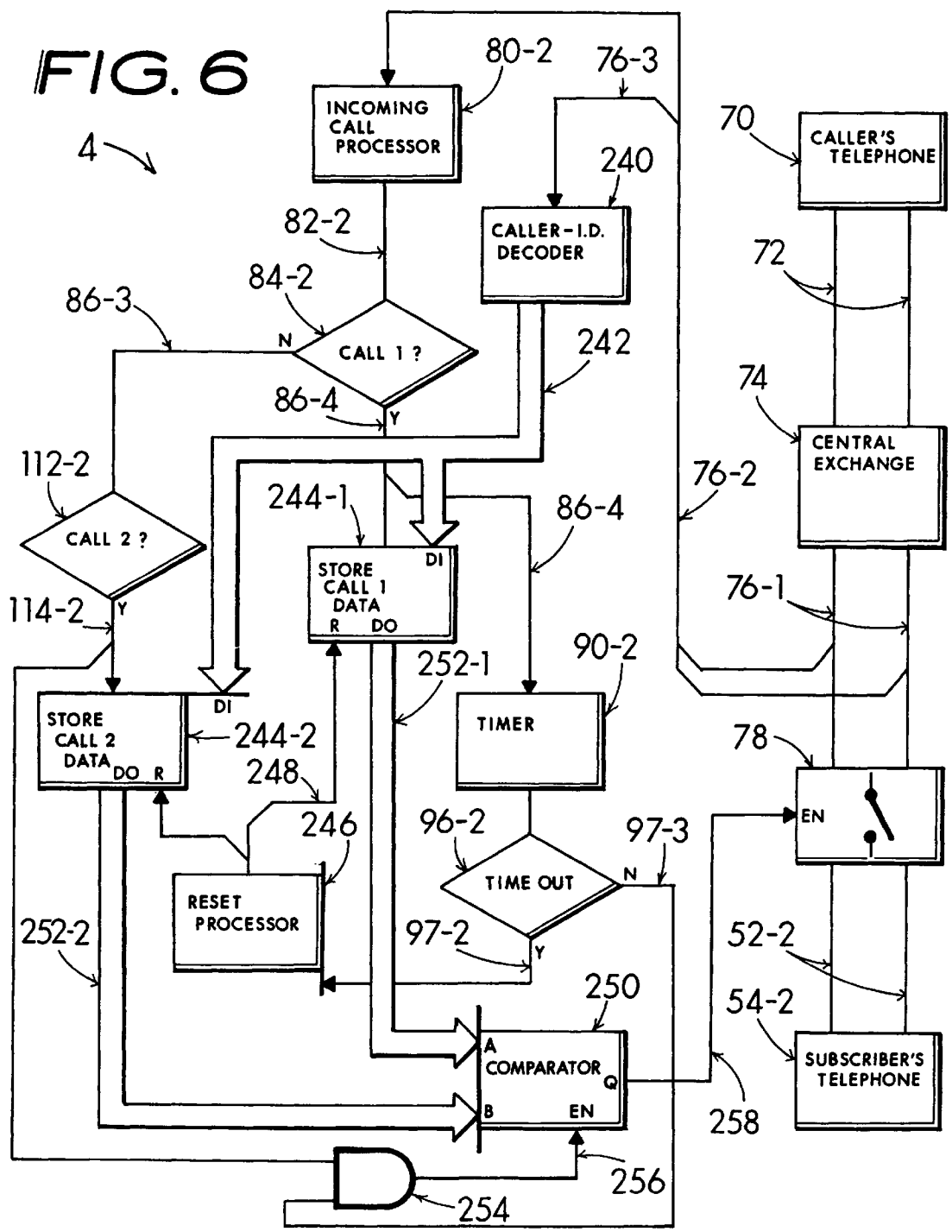

FIG. 6—Logic flow chart showing a ring cadence filter approach wherein disallowed calls are diverted to an answering machine.

Figure 7:
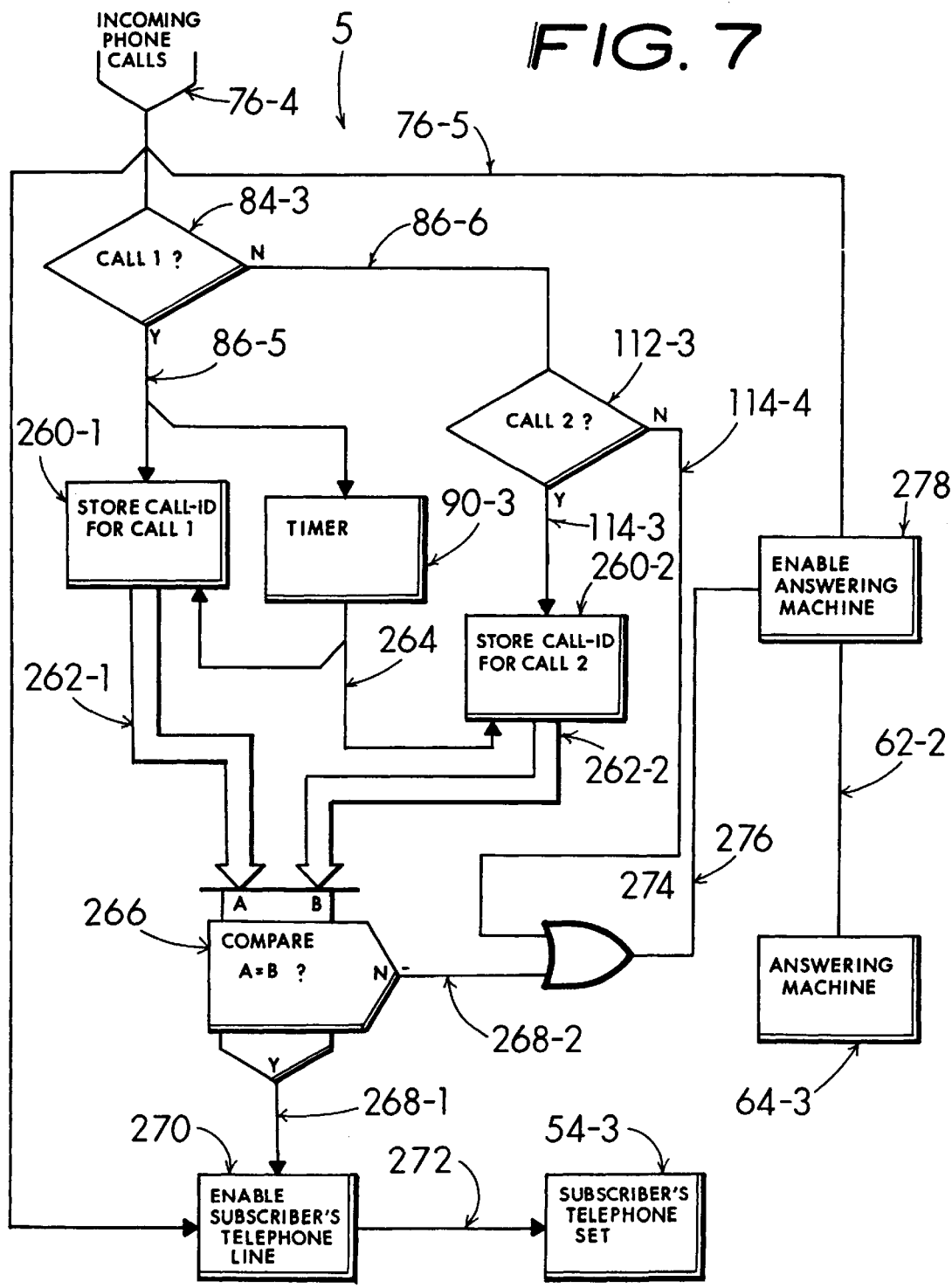

FIG. 7—Logic flow chart for an incoming call filter based upon caller-ID match-up.

Figure 8:
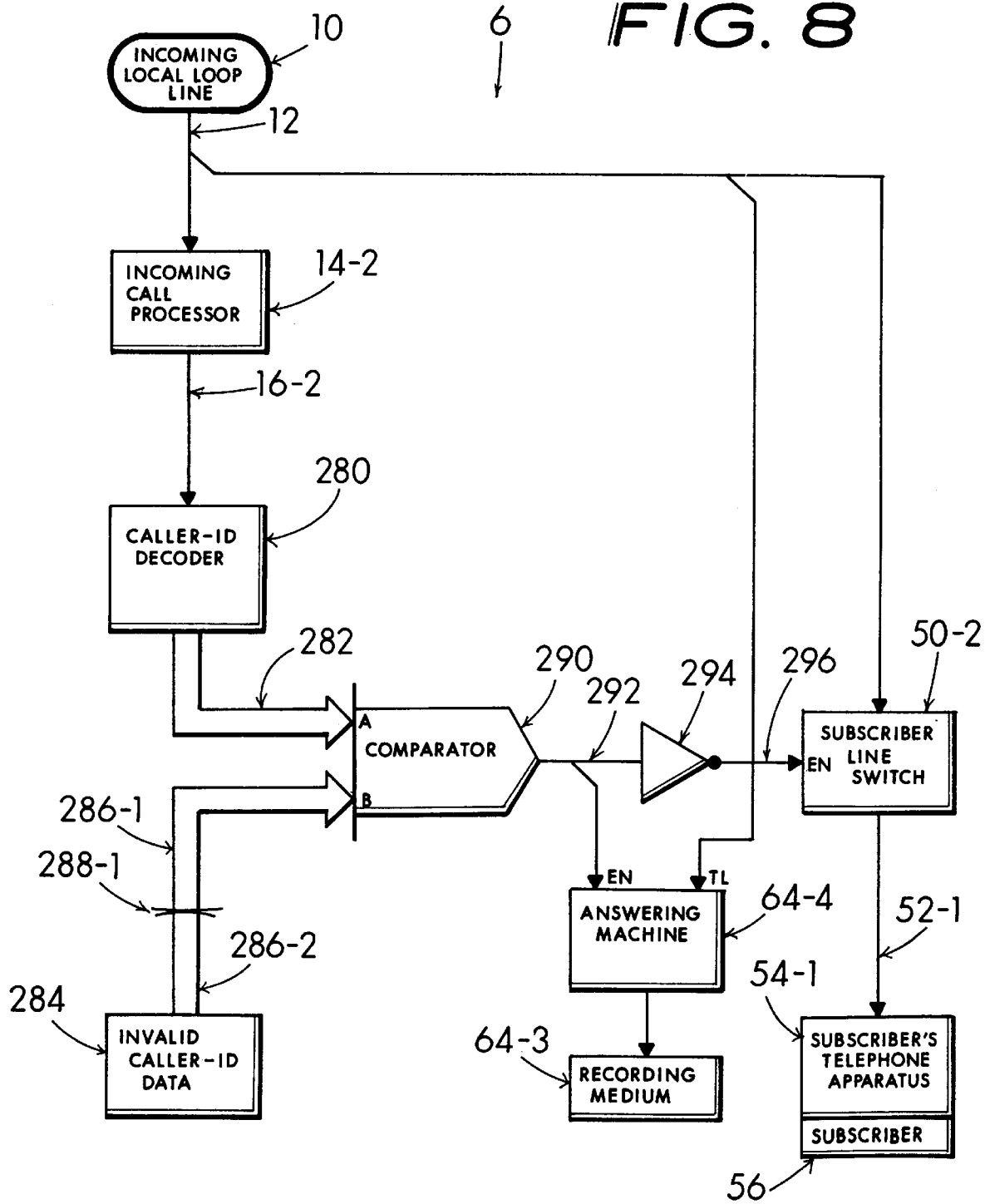

FIG. 8—Logic flow chart for a subfunction involving call filtering based upon using a file of invalid caller-ID data.

FIG. 9—Functional entry of a denied listing of caller-ID data.

FIG. 10—Functional entry of an acceptable listing of caller-ID data.

Figure 11:
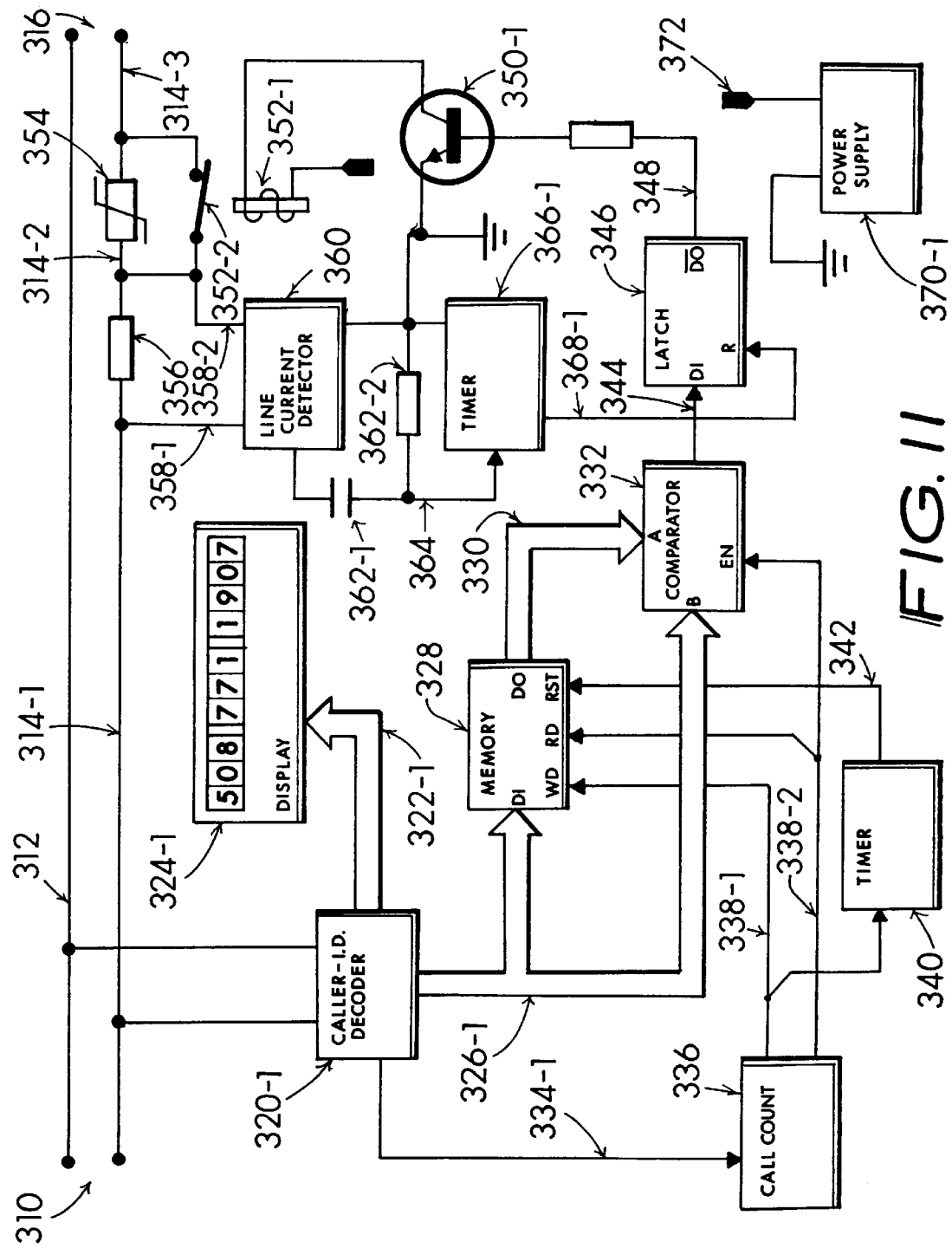

FIG. 11—Caller-ID device including call filtering utilizing matchup between a second caller-ID number's arrival and a stored first-arriving caller-ID number.

Figure 12:
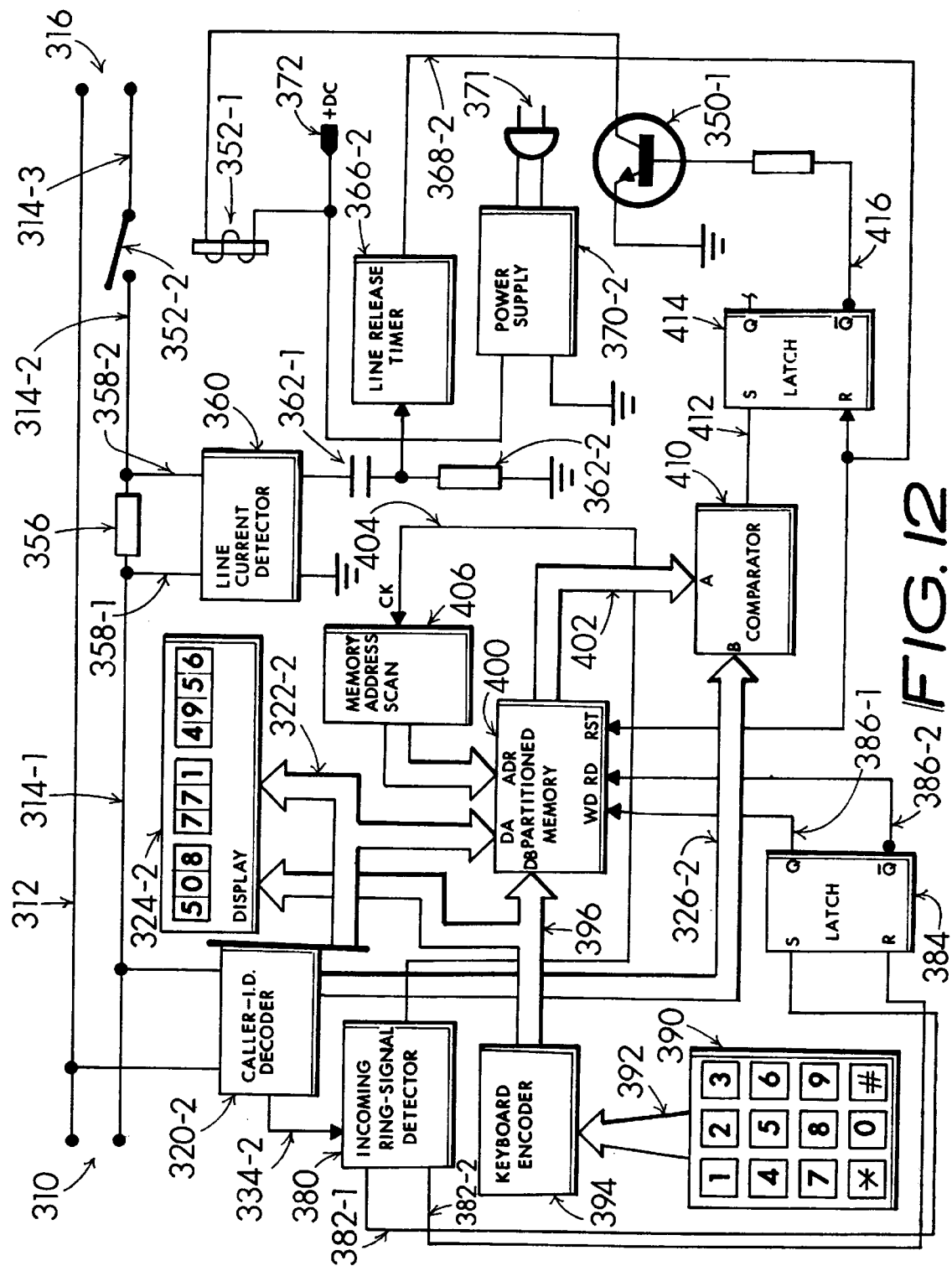

FIG. 12—Telephone call filtering using caller-ID and a list of keyed-in numbers to establish telephone call routing.

DESCRIPTION OF MY INVENTION

In FIG. 1 I show an overview 1 of my invention relative with receiving an incoming call from a local loop telephone line connection 10 which flows forth over line 12 to an incoming call processor 14-1, a line state detector 40, a line switch 50-1 and a line switch 60.

The incoming call processor 14-1 which amongst other functions ordinarily might be expected to include necessary network components for separating a.c. ring signal components from the d.c. line current. The delivered signal on line 16-1 couples with a first ring cadence detector 18, which responds to a first incoming ring with a Yes state on line 20-1, else a No state on line 20-2 for a subsequently occurring incoming ring. One of the decisive factors which separates a first incoming ring from a subsequent or improper incoming ring is a finding of the number of component ring cycles accompanying the incoming ring.

It is well known in the telephone art field that a typical telephone ring cadence is cyclic succession of on and off pulses of low-frequency a.c. signal energy. In the U.S. (and Europe) for example, a typical ringing cadence signal is a string of 17–25 hertz a.c. cycles (the ring frequency) formed in pulses of 2 seconds duration, separated by a dead period of 4 seconds. Each ring signal pulse typically includes about 34–50 complete ring frequency cycles. In technical terms, the ring cadence signal may be described as having a 0.167 Hz periodicity with a 33.3% duty cycle. Ordinarily, the ringing signal is relatively high in voltage. Ringing frequency signals are ordinarily presented with a 60–90 volt r.m.s. amplitude during the ringing pulse.

An assumption is necessary. Ordinarily this assumption manifests itself as a presetting or predetermination of a "cadence recognition" afforded by the first ring cadence detector. For example, if "3 rings" is preestablished as the correct first ring cadence, a TRUE state appears on line 20-1 (say, a HI state) which couples with a Set input of a latch 22, setting the Q output TRUE. Conversely, if the ring cadence is wrong, a TRUE state appears on the No line 20-2 coupled with an ENable input of the line switch 60. A "wrong" first cadence occurs when the caller allows more than three rings to occur before hanging-up. In either event, the cadence is incorrect denoting an improper incoming call most likely originated by an unaware caller.

The TRUE "No" or error state signal on line 20-2 which turns-on the line switch 60 serves to direct the incoming call (when more than 3 rings occur) to an answering machine 64-1 which includes a recording medium 64-2. Such a machine is typified by a White Consolidated Industries, Inc. model WNDTAD-485 and sold by K-Mart Corporation as their no. 731398004850. As a result, unwanted or nuisance calls are handled by well known answering machine protocol.

TWO-TIER INCOMING-CALL RECOGNITION

On the other hand, if three rings (or less) occur and the caller hangs-up the TRUE signal on the Yes line 20-1 Sets the latch 22 as mentioned, conveying a TRUE state on line 24 as coupled with an A-input of a comparator 36. This establishes a first tier of incoming call recognition.

In a scenario where the latch 24 is Set and line 24 is driven TRUE, but no second call arrives a procedural clearing of the filter is needed. This is automatically obtained by starting a timer 26 by occurrence of the incoming call signal on line 16-1. As a consequence of the incoming call, and in this example the first incoming call, the timer commences time count-down. With a preset timer period of 1 minute, for example, the line 28 is driven to a TRUE state during an elapse of the 1 minute timing period.

The TRUE state on line 28 couples with an AND gate 30, which is thereby enabled to couple the subsequently occurring incoming call on line 16-1 to a second ring-cadence detector 32. This second ring-cadence detector 32 produces a TRUE state on the Yes line 34 when a second incoming call occurs immediately subsequent to recognition of the first incoming call as being uniquely brief and when it also occurs before the timer 26 "times-out". In effect, the second tier incoming call passes a valid test.

In event no second incoming call occurs, or when the second call arrives after the timer 26 time-out completes, the timer delivers a FALSE state (e.g., LOW state) signal on line 28 which Resets the latch 22 and inhibits the AND gate 30. Recognize that the Reset input of the latch 22 is necessarily negative-edge triggered in this explanation and may be Set in either HIGH or LOW state of the Reset input provided on line 28.

When the comparator 36 A-Input is TRUE as mentioned and the B-Input is also TRUE as receiving from line 34, the comparator Q output becomes TRUE as coupled with an OR gate 44.

This TRUE state drives the OR gate 44 output 46 line TRUE and couples with an ENable input of the line switch 50-1. A direct result of this is the line switch couples the incoming call 12 to the subscriber's telephone apparatus 54-1 by way of line 52-1. As a result, a subscriber 56 receives the incoming call.

The line state detector 40 senses d.c. local loop line status and when the local loop is "off-hook", delivers a TRUE signal from the OFH output through line 42 as coupled with the OR gate 44. As a result, the line switch 50-1 is latched-on for as long as the subscriber's telephone apparatus 54-1 is maintained in an off-hook state by the subscriber 56.

CALLER ORIGINATES UNANTICIPATED CALL

In FIG. 2 I show origination of a call from an unknown caller's telephone 70 in the general depiction 2. As is customary in the art, the caller's telephone may represent any one of dozens or even hundreds of potential callers who may intend to call the subscriber. In addition, the caller's telephone may represent persons who originate unwanted "trash" calls. Trash calls include as those posed by telemarketers, bill collectors and other parties making unwanted, nuisance-level calls.

The incoming call couples over lines 72 and through a central exchange facility 74, where it translates into a local-loop line 76-1. The local loop line couples with a line switch 78 and therefrom over lines 52-2 coupled with the subscriber's telephone apparatus 54-2. The local loop line also couples via line 76-2 with an incoming call processor 80-1 which, as mentioned relative with a similar incoming call processor 14-1 of FIG. 1 may include network circuitry and other interface implementation details.

The incoming call is delivered on line 82-1 where it couples with a "call-1?" decider function 84-1 and an "on-hook?" decider function 120. When the incoming call is the first call, a TRUE signal on lines 86-1 delivers to a "3-rings?" decider function 88. When the first call is 3-rings in duration a TRUE appears on the Yes line 92 which couples with a Set input of a latch 94.

The TRUE first call signal on line 86-1 also couples with a timer 90-1 to initiate onset of a preestablished timing period of usually a minute (more-or-less and usually at the subscriber's determination) in duration. The timer couples with a "time-out" decider function 96-1 which yields a TRUE state on line 97-1 upon completion of the time period.

The TRUE state on line 97-1 couples through the AND gate 98 (assuming line 116 to be TRUE) and therefrom couples a TRUE state with an input of an OR gate 100. This introduces a TRUE or logic 1 state over line 102 into a Reset input of the latch 94.

As a result of the timer 90-1 time-out and an immediate TRUE state on line 116, the result is the overall functions associated with the call-1 filtering are reset or normalized awaiting the next call which may arrive.

On the other hand, if a second call arrives soon after the call-i is hung-up the second call couples from the decider function 84-1 through the No output line 86-2 with the "call-2?" decider function 112-1. As result a TRUE state appears on line 114-1 and is thereforth sent to a Set input of a latch 110. This setting of the latch establishes a TRUE state on line 118 and a NOT-TRUE state on line 116. As a result, the AND gate 98 is inhibited, blocking the TRUE state timeout signal which may appear on line 97-1 from being further effective.

The TRUE state on line 118 couples with an EN input of the line switch 78 establishing a path for the incoming call appearing on lines 76-1 to preferably couple with the subscriber's telephone apparatus 54-2.

When the subscriber picks-up the subscriber's telephone apparatus 54-2, the resulting "off-hook" state is translated via line 82-1 to the "on-hook?" decider function 120. As a result, a TRUE state on line 122-2 couples with the Set input of a latch 124, delivering a TRUE state on the Q output line 128 and an input of an AND gate 130. Concurrently, of course, the Yes output line 122-1 from the decider function 120 is maintained NOT-TRUE as coupled with the other input of the AND gate 130. As a result, the AND gate output line 131 is held NOT-TRUE, LOW or at logic-O level. The result is the charge across the capacitor 136 is negligible, being held discharged through the diode 134 and resistor 132-1. Hence, the Reset input of the latch 124 is LOW state.

When the subscriber's telephone apparatus 54-2 is later hung-up, the ON-HOOK state appearing on line 82-1 develops a NOT-TRUE state on line 122-2 and a TRUE state on line 122-1. For a brief moment, both of the inputs to the AND gate 130 are TRUE or HIGH state, resulting in a TRUE state on line 131 particularly as coupled with the OR gates 100 and 108. The result is a TRUE state appears on line 102 resetting the latch 94 and delivering a TRUE state on the IQ output as coupled with the OR gate 108. Simultaneous TRUE state coupling with the OR gate 108 also delivers a TRUE state to the Reset input of the latch 110, setting the Q output NOT-TRUE and thereby disconnecting the switch 78 and interrupting the telephone line local loop.

A further consequence of the TRUE state on line 131 is a charging-up of the capacitor 136 through the resistors 132-1, 132-2. A time constant is involved which can defer the switch-over time for the latch 124 Q output line 128 from a TRUE to a NOT-TRUE state for at least a few milliseconds.

When more than 3 rings are found by the decider function 104 during the call-1 detection phase, a TRUE state is delivered from the Yes output on line 106 to the OR gates 100,108. As a result, both latches 94,110 are force-reset and the line 118 level is NOT-TRUE either disconnecting, or maintaining disconnection of, the local loop line.

SELECT DIFFERENT FIRST-TIER CADENCE

In my device's circuit of FIG. 3 I show an overview circuit 3 with the local loop line receiving an incoming telephone call signal on terminals 140 whereas terminals 144 couple with an ordinary telephone apparatus, such as a telephone set. The local loop line extension 142-1 essentially "passes through" the device, whereas the other local loop line 142-2 seriately couples with a local loop line current detector 210, an intermediate line 142-3, a relay switch set 224-2 and an output line extension 142-4.

When the subscriber's telephone is hung-up or replaced "on hook" negligible d.c. line current flows through the local loop circuit. An incoming call's a.c. ring cadence signal couples with the ring detector 150, delivering a LOW state on line 152 correspondent with each ring signal component of about 2 seconds duration. As shown, this succession of 2 second duration negative pulses delivers to an input of an OR gate 154 and a NOT (e.g., inverter) function 202. Line 168-3 is ordinarily maintained in a LOW state by virtue of its connection with output lines associated with a 3:8 line decoder 164 wherein the unselected output lines 0–7 are maintained LOW. As a result the ring signal appearing on line 152 likewise appears on line 156 as coupled with a clock input ICK of a counter 160. The counter responds to the ring signal by advancing the binary state of a signal on bus 162, thereby establishing a corresponding selection of the decoder 164 outputs. When the output 3 from the decoder 164 is selected, the HIGH state level couples 166 with an input to the OR gate 170. Line 172 is immediately driven HIGH resulting in a coupling of the HIGH state through resistor 171 with line 168-3 and another input of the OR gate 170. As a result, the OR gate latches in a HIGH state. Similarly an input to the OR gate 154 is lifted HIGH, inhibiting clock signal flow through the gate.

A NOT device 174 delivers a LOW state on line 176 as coupled with the Reset input of a clocked counter 180 which serves to establish a time window between a first call's set of ring cadence signals and a subsequent call's set of ring signals. Hence, a 60-Hz clock signal provided by the clock 190 on line 192 may delay about 2.27 minutes before the Q14 line selected by a jumper 182 delivers a HIGH state on line 184 as coupled with a Reset input of the counter 160. As a result a window of opportunity for the second incoming call is established subsequent to receipt of the first incoming call having a correct number of ring cadence cycles (e.g, 3 in this illustrated example). In the shown hookup, the inter-call time window is anything within 2.27 minutes, or as may be preselected in accord with the following table:

| INTER-CALL TIME WINDOW 60-Hz Clock Source Frequency | | |
|---|---|---|
| COUNTER 180 OUT | DIVISION FACTOR | TIME WINDOW |
| Q12 | 2048 | 0.56 Min. |
| Q13 | 4096 | 1.13 Min. |
| Q14 | 8192 | 2.27 Min. |

Validity of incoming ring cadence components is verified by determining a "correct" inter-pulse delay between groups of ring cycle pulses. Recall that a usual ring cadence is 2 seconds ON, 4 seconds OFF, 2 seconds ON ad infinitum in successive alternation or until the caller hangs up, if the subscriber's equipment does not pickup. Recall further that the incoming ring signal delivers a HIGH state on line 204 which Resets the counter 200. When the incoming ring signal pauses between ring cadence cycles, line 204 similarly delivers a LOW state to the Reset input of the counter 200 enabling the counter.

Line 198 is usually LOW and therefore the 60-Hz clock signal on line 192 is coupled with the clock ICK input of the counter 200. Since the usual off-state period between ring cadence cycles is about 4 seconds, the 60-Hz clock signal may be counted to determine a time window somewhat less than the 4 seconds to determine a ring cadence recurrence. When the counter 200 counts up a HIGH state is delivered via jumper 201 to line 195 and an input of the AND gate 196.

Presuming line 172 to be HIGH as a result of a correct number of first incoming call ring counts, a HIGH state results on line 198 which couples with an input of AND gate 206 and an input of OR gate 194. The OR gate 194 is inhibited and the counter 200 is essentially latched. The AND gate 206 delivers a HIGH state to an input of NOR (NOT-OR) gate 208.

Prior to this occurrence the output state of the NOR gate 214 is held HIGH and couples through resistor 216 with a base element of a NPN transistor 220, thereby turning the transistor ON. Ensuing conduction through line 222 coupled with the transistor 220 collector energizes the relay coil 224-1 and pulls the contact set 224-2 to an open state, thereby interrupting telephone line current flow between the local loop line sections 142-3 and 142-4.

Upon receipt of the HIGH state from AND gate 206, the NOR gate 208 output drops LOW and the transistor 220 is shut-off. As a result, the relay is de-energized and the normally-closed contact set 224-2 re-closes, commissioning telephone line circuit completion between terminals 140 and 144.

A.c. electric power 232 couples with a power supply 230 to deliver d.c. power 234 necessitous for operation of my devices circuitry. Furthermore, the mentioned 60-Hz clock signal may be derived from the incoming a.c. electric power 232.

Absent any incoming telephone call, the relay contact set 224-2 is held "open" and the subscriber's telephone set ordinarily coupled with terminals 144 is disabled. A problem with this is that the subscriber can not originate an outgoing call. In order to provide this desirable capability, I show a resistor 226 coupled across the "open" relay contacts.

ORIGINATING OUTGOING CALLS

The resistor is selected to deliver a trickle of d.c. current through the local loop line when the subscriber's telephone set is lifted off-hook. Typically this current may be established in the range of 3–8 milliamperes for example, but the absolute value shall be determinable by the intended application. Recall that the range of off-hook current recognized by the central exchange as an off-hook state is ordinarily 20 milliamperes or more, albeit in some situations the central office may respond to considerably less than 20 milliamperes as off-hook. Knowing that the usual line potential (battery voltage) is −48 volts, the resistor 226 may call for a value of 5,600 ohms as representative.

When the subscriber lifts his telephone set off-hook in order to originate an outgoing call, the circuit completion through the off-hook telephone set across terminals 144 introduces a substantial d.c. current flow through the local loop line current detector 210. As a result, a HIGH state appears on line 212 as coupled with an input of the NOR gate 208. The immediate result is a dropout of the relay coil 224-1 and immediate closure of the relay contact set 224-2, thereby completing the local-loop line.

The local loop line current sensed by the presence of a HIGH state on line 212 also serves to maintain closure of the relay contacts 224-2 once the subscriber picks-up on an incoming call.

ACCEPTING A CALL WITH PRIORITY

With FIG. 4 I depict an event diagram showing an interrelationship between various signal states. The diagram depicts several signal states:

| LINE | DEPICTED FUNCTION OR STATES |
|---|---|
| AA | Incoming Call (Valid Call Shown) |
| AB | Timer (90-1) |
| AC | Call-1 Latch (94) |
| AD | Call-2 Latch (110) |
| AE | Subscriber Phone Ring Cadence |
| AF | Subscriber Conversation Period |
| AG | Call Complete (Hangup) |

Observe that line AA shows the incoming calls. LLL depicts a first incoming call whilst AAD is the next subsequent incoming call. For purpose of this illustration, incoming calls 10 AAA,AAD are intended bonafide incoming calls. A window timer period (element 90-1 of FIG. 2 for example) ABB commences ABA concurrent with full recognition of the first incoming call's third incoming ring cadence signal AAB. Similarly, a call-1 latch (element 94 of FIG. 2) is set HIGH ACB concurrent ACA with the first incoming signal recognition AAB.

Observe that the second incoming call cadence AAD occurs while the timer state ABB is HIGH. As a result, the call-2 latch 110 is set ADB and concurrent with recognition of the second ring AAE/ADA the second incoming call rings through AEA to the subscriber's telephone set following recognition of the second incoming call AAE/AEB.

Following several rings AEC, when the subscriber picks-up his telephone set AFA he may carry on a conversation for however long it takes AFB/AFC. When the subscriber hangs-up a call complete signal AGA/AGC immediately occurs AFE/AGC which resets ACE/ADE the latch states ACB/ACC and ADB/ADC. The conversational time may be various in duration as depicted by ACD,ADD and AFD.

DIVERTING AN UNTIMELY CALL

In my FIG. 5 I depict a similar set of event sequences, but with different relationships. The several time lines are represented as:

| LINE | DEPICTED FUNCTION OR STATES |
|---|---|
| BA | Incoming Call (Valid Call SHown) |
| BB | Timer (90-1) |
| BC | Call-1 Latch (94) |
| BD | Call-2 Latch (110) |
| BE | Subscriber Phone Ring Cadence |
| BF | Subscriber Conversation Period |
| BG | Call to Answering Machine (64-1) |

In FIG. 5 I show that two incoming calls appear BAA, BAD. For purpose of this drawing, I show the first incoming call BAA having an appropriate "3-rings" prior to hang-up BAB. This sets the timer B to proceed with an about 1 minute (more or less) time cycle BBB.

Furthermore, the call-1 latch 94 is set BCA to a TRUE state BCB and subsequently reset BCC when the timer "times-out" BBC.

Looking now at the second or subsequential call BAD, observe that the ring cadence occurs after the call-1 latch resets BCC. As a result, it is blocked from reaching the call-2 latch 110 as shown by unchanging line BDA. Similarly, the subscriber's telephone receives no call mention BEA and of course no conversation ensues BFA with the subscriber. However, the incoming call is shifted BAE/BGA to an answering machine for a period BGB during which time a message may be left by the caller. Upon completion of the answering machine activity, local loop line hangup is completed BGC and the overall system is available for the next call sequence.

USING REPEATED CALLER-ID RECOGNITION

In FIG. 6 I generally show 4 a local loop telephone system similar to that depicted in FIG. 2 in which the line 76-2 extends to an incoming call processor 80-2 with an output 82-2 coupled with a "call-1?" decider function 84-2. If it is the first incoming call, a TRUE state from the Yes line 86-4 output couples with the store call-i data memory 244-1.

A line 76-3 also promotes coupling of the incoming call with a caller-ID decoder 240 that yields a binary data signal on line 242 representative of information regarding the caller. Ordinarily this caller-ID information precedes answering a call and rides along with the ring-cadence portion of the telephone signaling sequence. In any event the binary data provided on line 242 is conveyed to the data input DI of the memory 244-1 where it is temporarily stored under instruction from the TRUE signal on line 86-4.

When the incoming call is a subsequential call the decider function 84-2 produces a TRUE on the "No" output line 86-3 to the call-2 decider 112-2. Upon meeting call-2 criteria, a TRUE state appears on line 114-2 which enables the memory 244-2 to store call-2 data received from the signal bus 242 provided by the caller-ID decoder 240.

Looking back now, when the TRUE state appeared on the line 86-4 the timer 90-2 was initiated for a preestablished period of typically 0.5 to 5 minutes. During the timing period the "time-out" decider 96-2 yields a TRUE, state on the "No" line 97-3 as coupled with an input of an AND gate 254. Similarly, the TRUE state which may appear on line 114-2 couples with another input of the AND gate 254. When both inputs of the gate are TRUE, a TRUE signal yields on line 256 as coupled with the enable EN input of a binary comparator 250.

In this configuration, the comparator 250 A-input signals 252-1 represent stored call-1 data whilst the B-input signals 252-2 denote stored call-2 data. When the A=B comparative function is satisfied, the Q output line 258 yields a TRUE state as coupled with the enable EN input of the line switch 78. Thereupon, call completion to the subscribers telephone 54-2 is accomplished.

On occasion the second incoming call will arrive after the timer 90-2 has timed out. In another setting, only a singular call arrives which is coincidentally mistaken as call-1. Each of these conditions can lead to erroneous filtering, so what occurs is the time-out decider 96-2 delivers a TRUE state on line 97-2 after the timer 90-2 cycle completes. The line 97-2 signal addresses a reset function 246 which delivers necessary reset control signals on line 248 to the call-i memory 244-1 and call-2 memory 244-2. As a result, the overall configuration is reset awaiting the next incoming call sequence.

In FIG. 7 I show another flowchart 5. Incoming telephone calls are delivered via lines 76-4 as usually derived from local loop lines 76-1. The incoming calls are directed to a "call-1?" decider function 84-3, a subscriber's telephone set line switch 270 and an answering machine line switch 278.

Initially both of the line switches 270,278 are "off". Upon a decided receipt of call-1 a TRUE state appears on line 86-5 which allows a caller-ID value to be stored in a memory 260-1 and initiates run of a timer 90-3.

Ordinarily the first call-in is allowed to ring for a prescribed number of ring cycles (for example, 3 cycles) and the calling party "hangs-up". Immediately thereafter the same calling party may call-back using an automatic redial feature commonly available on a subscriber's telephone set, or by manual number re-entry. When this re-dial is accomplished within the time window afforded by the timer 90-3, the second call is recognized as not being Call-1 by the decider 84-3 yielding a TRUE signal on line 86-6 thereby coupling with the "call-2" decider 112-3. As a result a TRUE level appears on line 114-3, enabling the memory 260-2 to store the second call's caller-ID data.

At this point, call-1 data appears on line 262-1 while call-2 data appears on line 262-2 as shown coupled with the A-input and B-input of a comparator 266. When the A-input and the B-input data are equivalent, such as when:

$$(A=50842965.3)=(B=5084296563)$$

then Yes line 268-1 TRUE, else No line 268-2 TRUE. When line 268-1 is TRUE, the line switch 270 is enabled and the second incoming call couples over line 76-4 and line 272 with the subscriber's telephone set 54-3. Conversely, if line 268-2 is TRUE as when the inputs A and B are not equivalent, the TRUE state couples through OR gate 274 to enable the line switch 278. As a result, the line 76-5 couples the incoming call over line 62-2 with an answering machine 64-3 to receive the incoming call.

In event the second incoming call arrives too-late, e.g. after the timer 90-3 times-out, a reset signal appears on line 264 which dumps the contents of the memories 260-1,260-2.

In event the incoming call is not recognized as call-2 by the decider 112-3, a TRUE state appears on the "No" output line 114-4 as coupled with the OR gate 274. The result is the unrecognized incoming call is directed to the answering machine 64-3.

DIVERTING CERTAIN CALLER-ID CALLS

In my generalized diagram 6 of FIG. 8, I show an incoming local loop line connection 10 providing an incoming telephone call on line 12. The incoming call is led to an incoming call processor 14-2 which delivers a formatted telephone signal on line 16-2. Line 16-2 couples with a caller-ID decoder 280, providing data to an A-input of a comparator 290.

The B-input of the comparator 290 couples with a source of "invalid caller-ID data" 284, delivered as data signals over bus lines 286-1,286-2. The invalid caller-ID data is provided as a list of telephone numbers which are not to be routed directly to the subscriber's telephone apparatus 54-1. This feat is accomplished when the A and B inputs of the comparator are un equatable, e.g., A<>B, in which setting a TRUE state appears on line 292 and couples through the NOT function 294 as a NOT-TRUE state on line 296 therefrom coupled with the enable EN input of the line switch 50-2. As a result, the incoming signal on line 12 is barred from reaching the subscriber's telephone set 54-1 through line 52-1. At the same time, the TRUE state on line 292 couples with the enable EN input of the answering machine 64-4 thereby empowering it to accept an incoming call appearing on line 12, subsequently recording it on medium 64-3 for later perusal.

CREATING A DENIED CALLER-ID LISTING

In the arrangement 7 of FIG. 9 I show a keypad 300-1 which might be utilized by a subscriber to enter one or more telephone numbers over the data line 302-1 for encodement 304-1 and transfer 306-1 to a denied listing data file memory 308-1. The memory output extends 286-3 to couple 288-2 with the disjuncture 288-1 of the preceding FIG. 8. As a result of this arrangement, the subscriber may enter one or more telephone numbers from whom he does not wish to receive bothersome calls and in accord with the teaching associated with FIG. 8, these same calls will be routed to an optionally available answering machine 64-4.

CREATING A CALLER-ID PRIORITY LIST

In the arrangement 8 of FIG. 10 I show a keypad 300-2 which might be utilized by a subscriber to enter one or more telephone numbers over the data line 302-2 for encodement 304-2 and transfer 306-2 to an acceptable or preferential listing data file memory 308-2. The memory output extends 286-4 to couple 288-3 with the disjuncture 288-1 of the preceding FIG. 8. As a result of this arrangement, the subscriber may enter one or more priority rated telephone numbers from whom he does wish to receive calls at any time and in accord with the teaching associated with FIG. 8, all other calls not found in this acceptable listing data file will be directly routed to an optionally available answering machine 64-4.

CALLER-ID BASED FILTERING AND DISPLAY

With FIG. 11 I show my call filter to include terminals 310 coupled with the incoming call local loop line. Line 312 couples through to one of the terminal set 316 which serves to connect with the subscriber's telephone set.

Line 314-1 seriately couples with a resistor 356, a line section 314-2, a varistor 354 and another line section 314-3 terminating with the terminal set 316. A caller-ID decoder 320-1 is bridged across the incoming line portions 312, 314-1 to receive and decode the pertinent data relating to the caller's identity, if available.

The decoded data is typically coupled with a display 324-1 via the data bus 322-1.

Furthermore, the decoded data is translated over another data bus 326-1 to a memory 328 and the B-input of a comparator 332. Additionally a call-count signal on line 334-1 advances the call count processor 336 relative with the order of incoming calls. A first incoming call flag signal appears as a TRUE state on line 338-1 and couples to the write data WD input of the memory 328, thus storing the immediate caller-ID data on bus 326-1. The 0 line 338-1 state also starts a timer 340 which may have a preselected time period between 0.5 and 5 minutes, more or less.

Next a second incoming call may arrive within the time window afforded by the timer 340. As a result, a TRUE signal flag appears on line 338-2 which couples with the read data RD input of the memory 328 and the enable EN input of the comparator 332. The read data RD signal enables the stored first caller-ID data to be translated over the data bus 330 to an A-input of the comparator 332.

If the read data on bus 330 applied to the A-input and the immediate second incoming call-plied ID applied to the B-input are equivalent, the output line 344 flags TRUE as coupled with the input DI of a latch 346. As a result the latch 346 output /DO drives LOW. The LOW state substantially shuts-off conduction through the NPN transistor 350-1 and the relay coil 352-1 is de-energized, resulting in closure of the normally closed relay contact set 352-2. As a result an incoming call coupled with terminals 310 will pass through and couple with terminals 316 and ultimately the subscriber's telephone set.

In a different setting, when the two separate caller-ID data signals applied to the A-input and B-input of the comparator 332 are distinctly differing in numerical value, the signal on line 344 assumes a LOW state since the comparator's A<>B=0 function is satisfied. The LOW state on the DI input of the latch 346 translates into a HIGH state on line 348, resulting in current flow through the transistor 351-14 0 and relay coil 352-1. The relay contact set 352-2 is thusly opened and the incoming telephone signal is denied transfer to the output terminals 316.

Looking back now, the timer 340 which is initiated with the first incoming call delivers a HIGH state signal to the reset RST input on the memory 328 to erase the stored data once time-out occurs.

The resistor 356 couples in series with the closed contact set 352-2 when the subscriber's telephone set is signaled. When the subscriber picks-up the telephone set (e.g., off-hook state occurs) substantial d.c. current flow occurs and the line current detector as coupled across the resistor 356 by lines 358-1,358-2 produces a TRUE level signal which is differentiated by the capacitor 362-1 in conjunction with a resistor 362-2. The signal couples 364 with the timer to trigger it into operation. The timer output 368-1 couples with the latch 346 ultimately releasing the local loop line. D.c. power 372 is provided from a power supply 370-1.

With FIG. 12 I show the incoming telephone call coupled into terminals 310 which ordinarily couple with the local loop line. Similarly, the subscriber's telephone set couple with the terminals 316.

A caller-ID decoder 320-2 receives input data from lines 312,314-1 which is presented as data on bus 322-2 and may be viewed by the user, on the display 324-2. A ring cadence signal appears on line 334-2 which couples with a ring signal detector 380 that differentiates valid incoming rings from those which may not be. A valid incoming ring cadence on line 334-2 is typically interpreted into a TRUE state pulse on line 382-1 as coupled 386-1 with the write data WD input of a partitioned memory 400. As a result, the data on bus 322-2 appearing on the data input DA of the memory 400 is stored.

A TRUE pulse appears on line 382-2 upon arrival of the second ring cadence signal. As a result the latch 384 is reset and the IQ output delivers a TRUE signal over line 386-2 with the read data RD input of the memory 400. A concurrent caller-ID data set appears on line 326-2 representing the second incoming call as coupled with a B-input of the comparator 410. At the same moment, data read from the memory 400 is presented over data bus 402 with the A-input of the comparator 410. If the first incoming call and the second incoming call have the same caller-ID, the A=B function of the comparator is satisfied and a TRUE state appears on line 412 which couples with and sets the latch 414. Conversely, if the two compared telephone numbers received by the comparator do not match and hence the equivalential satisfaction of the comparator is not met by a prevailing A<>B comparison instead, a FALSE state appears on line 412. Timed reset is obtained by coupling a TRUE level pulse delivered by the line release timer 366-2 over line 368-2 to the reset RST input of the memory 400 and the reset R input of the latch 414.

Find that a TRUE state on line 414 introduces conduction through the NPN transistor 350-1 and the relay coil 352-1, resulting in an opening of the normally-closed relay contact set 352-2 coupled between local loop line extensions 314-2,314-3.

Observe that the incoming ring signal detector may also deliver a signal over line 404 which clocks CK the memory address scan, delivering binary state address data over the bus 408 to the memory address input AD in order to read-in and/or read-out data from the partitioned memory 400. D.c. power appearing at juncture 372 may be delivered from a power supply 370-2 coupled with the a.c. power line 371.

I proceed to give illustrative examples of methods and accompanying apparatus particularly suitable for practice of my incoming telephone call filtering method. I disclose a utilizing if a unique multi-tiered ring cadence recognition and a caller-ID matching approach to determine incoming call path routing.

By no means shall any exactness extended by the illustrative details of my teaching be construed as limiting the absolute scope of my incoming telephone call filtering or call management device to a particular combination of methods., elements or structural configurations.

The numerous approaches which I describe as illustrative are intended to respond to an incoming call's pattern, time sequence or supporting data information and directly determine routing of the incoming call. Such routing may lead to an ancillary telephone device so as to not bother the subscriber or to the subscriber's immediate telephone set when the incoming call is recognized as having sufficient merit for such automatic transfer.

I make it obvious that my described approaches might be embodied to take other modified forms of logical or physical implementation which can be readily engineered to best satisfy a particular application. A suitably knowledgeable artisan may reasonably choose to take advantage of different technological parts, operational protocols or implementation techniques without departing from the underlying spirit of my invention. I also show commonplace positive-logic descriptions, realizing that negative-logic may be equally effective without departing from my invention's essence when the appropriate signal-level and polarity-sense considerations are engineered in.

An adaptation of my teaching to operate in conjunction with a contemporaneous micro-processor, RISC controller or programmable logic array is considered an obvious engineering expedient in view of current practices within the telephony art-field. Reduction of my methods to software practices by a software engineer (viz, programmer) useful with the micro-processor or integrated gate arrays are further refinements which a knowledgeable artisan may reasonably utilize in practice of my invention without escape of the central bounds of my invention's novel methods.

A practicing artisan shall clearly realize that when I give example of specific operating conditions for the representative operation of methods and circuitry associated with incoming telephone call detection and recognition, or when I call for particular components or operating values, these definitions are merely to serve as initiative for the artisan's hindsight and as guidelines which may assist in explaining the art advancements which I have presently developed, particularly in view of traditional telephone system arrangements.

These guidelines must not be construed as narrowly definitive, limiting or regulatory regarding any specific configuration or operative methodology of my invention. This is an important point to ponder, in view of the rapid advancement telephone technology is making.

At the focus of my invention is found an incoming telephone call filtering method which affords selective routing of the incoming call to a subscriber's telephone or else to an ancillary telephone apparatus depending upon meritorious determinations made relative with the incoming call's importance or urgency. My explanations focus on two tiers of incoming call recognition as a filtering approach but use of additional tiers of incoming call recognition shall be considered will within my invention's anticipated extensions. This conceptual intent precludes modification of or dependence upon any absolute telephone system operating specifications, other than what is broadly stated by way of example in this document.

At most, my teaching should be understood as providing broad illustrative examples which I have found suitable in several forms of my invention and for use with contemporaneous central-exchange based telephone systems. My recommendations for practice are presently introduced to intentionally convey a more comprehensive understanding of my invention's underlying methodological objectives.

What I claim for my invention is:

1. An incoming telephone call filtering method for a subscriber's primary telephone apparatus comprising steps of:

receiving a first incoming telephone call signal originated by a first caller and first arriving via a first telephone line;

blocking a coupling of the first incoming telephone call signal with the subscriber's primary telephone apparatus;

recognizing a first caller identification number (first caller-ID number) for the first incoming telephone call signal;

storing the first caller-ID number;

receiving a second incoming telephone call signal ordinarily reoriginated by the first caller and second arriving over the first telephone line;

recognizing a second caller identification (caller-ID number for the second incoming telephone call signal;

comparing the second caller-ID number with the stored first caller-ID number; and, transferring the second incoming telephone call signal to the subscriber's primary telephone apparatus in response to the comparison of the stored said first caller-ID number and the second caller-ID number as substantially coequal.

2. The incoming telephone call filtering method of claim 1 comprising a further step of:

blocking a coupling of the second incoming telephone call signal with the subscriber's primary telephone apparatus when the stored said first caller-ID number and the second caller-ID number are substantially disparate.

3. The incoming telephone call filtering method of claim 2 comprising a further step of:

diverting the blocked Said second, incoming telephone call signal to an alternate telephone apparatus.

4. The incoming telephone call filtering method of claim 1 comprising a further step of:

prescribing at least one vigilant telephone number;

comparing the first caller-ID number with the vigilant telephone number; and, diverting the first incoming telephone call signal to an alternate telephone apparatus in response to a substantial match between the first caller-ID number and an unwelcome said vigilant telephone number; and, transferring the first incoming telephone call signal to the subscriber's primary telephone apparatus in response to a substantial match between the first caller-ID number and a preferential said vigilant telephone number.

5. The incoming telephone call filtering method of claim 1 further comprising an erasing of the stored said first caller-ID number upon an occurrence of at least one step of:

a receiving of a dissimilar said second incoming telephone call signal; and, an elapse of a predetermined period of time subsequent to receiving the first incoming telephone call signal.

6. An incoming telephone call screening method comprising steps of:

intercepting a first incoming telephone call signal originated by a first caller and first arriving via a first telephone line;

inhibiting the subscriber's telephone apparatus from telltale signaling in response to the intercepted said first incoming call signal;

establishing a first flag signal first denoting the first incoming call-signal;

receiving a second incoming telephone call signal usually reoriginated by the first caller and second arriving on the first telephone line;

establishing a second flag signal second denoting the second incoming telephone call signal; and, routing the second incoming call-signal to the subscriber's primary telephone apparatus in response to a substantial correlation between the first flag signal and the second flag signal.

7. The incoming telephone call screening method of claim 6 further comprising a step of:

decoding a first caller-ID data set for the first incoming telephone call-signal to predicate the first flag signal;

storing the first flag signal;

said intercepting a second incoming telephone call-signal;

decoding a second caller-ID data set for the second incoming telephone call-signal as the second flag signal; and, coupling the second incoming call with the subscriber's telephone apparatus in response to the substantial correlation between the first flag signal and the second flag signal.

8. The incoming telephone call screening method of claim 6 further comprising a step of:

diverting the second incoming telephone call signal to a second telephone receiving apparatus when the stored said first flag signal and the second flag signal are substantially disparate.

9. The incoming telephone call screening method of claim 6 further comprising a step of:

tallying component ring signals associated with the first incoming telephone call;

diverting the first incoming telephone call signal to a second telephone receiving apparatus when the component ring signal tally contravenes a predetermined number of rings.

10. The incoming telephone call screening method of claim 7 further comprising a step of:

erasing the stored said first flag signal when the stored said first flag signal and the second flag signal are determined as comparatively disparate;

subsequently storing the second flag signal;

said intercepting a tertiary incoming telephone call signal;

decoding a tertiary flag signal from caller-ID data accompanying the tertiary incoming telephone call signal;

comparing the stored said second flag signal and the tertiary flag signal; and, routing the tertiary incoming telephone call to the subscriber's telephone apparatus in concurrent response to a substantial value equivalence between the second flag signal and the tertiary flag signal.

11. The incoming telephone call screening method of claim 6 further comprising a step of:

erasing the stored said first flag signal when a predetermined period of time elapses between the interception of the first incoming telephone call signal and a subsequent said interception of the second incoming telephone call signal.

12. The incoming telephone call screening method of claim 6 further comprising steps of:

detecting the first flag signal to comprise a first ring cadence signal accompanying the first incoming telephone call signal; and, first blocking the subscriber's telephone apparatus from the telltale signaling in response to the detected said first ring cadence signal.

13. The incoming telephone call screening method of claim 12 further comprising steps of:

detecting the second flag signal to comprise a second ring cadence signal accompanying the second incoming telephone call signal;

first accumulating a first ring-count number of on-state ring signal periods alternating with off-state ring signal periods that may occur during the detected said first ring cadence signal;

second accumulating a second ring-count number of the on-state ring signal periods alternating with the off-state ring signal periods that may occur during the detected said second ring cadence signal;

second blocking the telltale signaling of the subscriber's telephone apparatus in response to the second and subsequent ring cadence signal when first accumulated tally of the first ring-count number contravenes a first predetermined number of ring count occurrences.

14. The incoming telephone call screening method of claim 13 further comprising steps of:

timing elapse of a first interval of time at least extensive subsequent to a completion of the first ring cadence signal; and, resetting the accumulated said first ring-count number to an initial value and usually to zero subsequent to the timed elapse of the first interval of time.

15. An incoming telephone call filtering method for a subscriber's telephone apparatus comprising steps of:

intercepting a first telephone call first incoming via a first telephone line;

blocking a coupling of the first telephone call with a subscriber's primary telephone set;

intercepting a second telephone call second incoming via the first telephone line;

comparing a calling characteristic of the subsequent telephone call with the calling characteristic of the first telephone call; and, enabling a coupling of the second telephone call with a subscriber's primary telephone set when a predetermined call acceptance criteria is realized by the compared calling characteristics.

16. The incoming telephone call filtering method of claim 15 further comprising steps of:

counting separate ring signal occurrences which may occur during a ring cadence signal portion of the first telephone call; and, defining the call acceptance criteria to recognize a predetermined number of the counted said ring signal occurrences accompanying the first telephone call.

17. An incoming telephone call filtering method of claim 15 further comprising steps of:

decoding a first caller-ID number accompanying the first telephone call as a first calling characteristic;

decoding a second caller-ID number accompanying the second telephone call as a second calling characteristic; and, defining the second call acceptance criteria to include a substantial equivalence between the first calling characteristic and the second calling characteristic.

18. An incoming telephone call filtering method of claim 15 further comprising steps of:

presetting a defined telephone number in a memory as the predetermined call acceptance criteria;

decoding at least one of:

a first caller-ID number accompanying the first telephone call as a first calling characteristic and a second caller-ID number accompanying the second telephone call as a second calling characteristic;

comparing at least the first caller-ID number with the predetermined call acceptance criteria; and, said blocking the coupling of at least one of the first telephone call and the second telephone call with the subscriber's primary telephone set when a substantial comparative match is obtained between at least one of the first calling characteristic and the second calling characteristic relative with the predetermined call acceptance criteria.

19. An incoming telephone call filtering method of claim 15 further comprising steps of:

presetting a defined telephone number in a memory as the predetermined call acceptance criteria; and, decoding at least one of:

a first caller-ID number accompanying the first telephone call as a first calling characteristic and a second caller-ID number accompanying the second telephone call as a second calling characteristic;

enabling an immediate coupling of the first telephone call with the subscriber's telephone primary telephone set when a substantial comparative match is obtained between the first calling characteristic and the predetermined call acceptance criteria.

20. An incoming telephone call filtering method of claim 15 further comprising a step of:

defining the predetermined call acceptance criteria to include a recognition of a preestablished number of ring signal pulses accompanying a first ring cadence signal portion of the incoming first telephone call in combination with a second ring cadence signal portion of the incoming second telephone call occurring prior to an elapse of less than a predetermined period of time between a receiving of the first telephone call and the second telephone.

* * * * *